(12) United States Patent  
Zeng et al.

(10) Patent No.: US 12,204,225 B2
(45) Date of Patent: Jan. 21, 2025

(54) DISPLAY PANEL AND DISPLAY DEVICE

(71) Applicant: Shanghai Tianma Micro-electronics Co., Ltd., Shanghai (CN)

(72) Inventors: Yang Zeng, Shanghai (CN); Feng Lu, Shanghai (CN); Wanlong Guo, Shanghai (CN); Yaodong Wu, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 85 days.

(21) Appl. No.: 18/115,093

(22) Filed: Feb. 28, 2023

(65) Prior Publication Data

US 2024/0219804 A1 Jul. 4, 2024

(30) Foreign Application Priority Data

Dec. 30, 2022 (CN) .......................... 202211733937.0

(51) Int. Cl.
*G02F 1/29* (2006.01)
*G02B 30/33* (2020.01)
*G02F 1/01* (2006.01)
*G02F 1/13363* (2006.01)
*G02F 1/139* (2006.01)
*G03H 1/22* (2006.01)

(52) U.S. Cl.
CPC .............. *G02F 1/29* (2013.01); *G02F 1/0136* (2013.01); *G02F 1/133638* (2021.01); *G02F 1/1393* (2013.01); *G03H 1/2205* (2013.01); *G03H 1/2286* (2013.01); *G03H 1/2294* (2013.01); *G02B 30/33* (2020.01); *G02F 2201/30* (2013.01); *G02F 2203/07* (2013.01); *G02F 2413/01* (2013.01); *G03H 2001/2234* (2013.01); *G03H 2222/13* (2013.01); *G03H 2223/20* (2013.01); *G03H 2223/22* (2013.01); *G03H 2225/34* (2013.01)

(58) Field of Classification Search
CPC .... G02F 1/29; G02F 1/133638; G02F 1/0136; G02F 1/1393
See application file for complete search history.

(56) References Cited

U.S. PATENT DOCUMENTS

2022/0264076 A1* 8/2022 Makinen .............. H04N 13/315

* cited by examiner

*Primary Examiner* — Lucy P Chien
(74) *Attorney, Agent, or Firm* — Anova Law Group, PLLC

(57) ABSTRACT

A holographic display system, a holographic display method and an electronic device are provided. The holographic display system includes a backlight module configured to emit a backlight beam, a spatial light modulator configured to perform phase and amplitude modulations on the backlight beam, and a plurality of liquid crystal grating modules that are sequentially arranged in a first direction. Based on a polarization direction of incident light, a liquid crystal grating module is capable of changing or maintaining a propagation direction of the incident light. A first optical rotator disposed on a light-incident side of the liquid crystal grating module is capable of rotating the polarization direction of the incident light, to make at least one liquid crystal grating module change the propagation direction of the incident light, and at least one liquid crystal grating module do not change the propagation direction of the incident light within a preset duration.

21 Claims, 13 Drawing Sheets

DISPLAY PANEL AND DISPLAY DEVICE

CROSS-REFERENCE TO RELATED APPLICATION

This application claims the priority of Chinese patent application No. 202211733937.0, filed on Dec. 30, 2022, the entirety of which is incorporated herein by reference.

FIELD

The present disclosure generally relates to the field of holographic display technology and, more particularly, relates to a holographic display system, a holographic display method and an electronic device.

BACKGROUND

To meet people's needs for stereoscopic display of electronic devices, an electronic device with a 3D holographic display function has become a major development direction in the display field. The electronic device can realize the 3D holographic display function by integrating a holographic display system.

The holographic display system needs to be equipped with a liquid crystal grating module to adjust the propagation direction of light to form left- and right-eye images, thereby realizing the 3D holographic display. In an existing holographic display system, the liquid crystal grating module is required to have a substantially high screen refresh rate.

SUMMARY

One aspect of the present disclosure provides a holographic display system. The holographic display system includes a backlight module, a spatial light modulator, and a plurality of liquid crystal grating modules that are sequentially arranged in a first direction. The backlight module is configured to emit a backlight beam. The spatial light modulator is configured to perform a phase modulation and an amplitude modulation on the backlight beam. The plurality of liquid crystal grating modules are sequentially disposed in the first direction. Based on a polarization direction of incident light, a liquid crystal grating module of the plurality of liquid crystal grating modules is capable of changing a propagation direction of the incident light or maintaining the propagation direction of the incident light. A first optical rotator is disposed on a light-incident side of at least one liquid crystal grating module of the plurality of liquid crystal grating modules. The first optical rotator is capable of rotating the polarization direction of the incident light, to make at least one liquid crystal grating module change the propagation direction of the incident light, and at least one liquid crystal grating module do not change the propagation direction of the incident light within a preset duration.

Another aspect of the present disclosure provides a holographic display method. The holographic display method includes providing a holographic display system. The holographic display system includes a backlight module, a spatial light modulator, and a plurality of liquid crystal grating modules that are sequentially arranged in a first direction. The backlight module is configured to emit a backlight beam. The spatial light modulator is configured to perform a phase modulation and an amplitude modulation on the backlight beam. The plurality of liquid crystal grating modules are sequentially disposed in the first direction. Based on a polarization direction of incident light, a liquid crystal grating module of the plurality of liquid crystal grating modules is capable of changing a propagation direction of the incident light or maintaining the propagation direction of the incident light. A first optical rotator is disposed on a light-incident side of at least one liquid crystal grating module of the plurality of liquid crystal grating modules. The first optical rotator is capable of rotating the polarization direction of the incident light, to make at least one liquid crystal grating module change the propagation direction of the incident light, and at least one liquid crystal grating module do not change the propagation direction of the incident light within a preset duration. The holographic display method also includes emitting the backlight beam through the backlight module, and performing a phase modulation and an amplitude modulation on the backlight beam through the spatial light modulator. Further, the holographic display method includes based on the first optical rotator, within the preset duration, making at least one liquid crystal grating module change the propagation direction of the incident light, and at least one liquid crystal grating module do not change the propagation direction of the incident light.

Another aspect of the present disclosure provides an electronic device. The electronic device includes a holographic display system. The holographic display system includes a backlight module, a spatial light modulator, and a plurality of liquid crystal grating modules that are sequentially arranged in a first direction. The backlight module is configured to emit a backlight beam. The spatial light modulator is configured to perform a phase modulation and an amplitude modulation on the backlight beam. The plurality of liquid crystal grating modules are sequentially disposed in the first direction. Based on a polarization direction of incident light, a liquid crystal grating module of the plurality of liquid crystal grating modules is capable of changing a propagation direction of the incident light or maintaining the propagation direction of the incident light. A first optical rotator is disposed on a light-incident side of at least one liquid crystal grating module of the plurality of liquid crystal grating modules. The first optical rotator is capable of rotating the polarization direction of the incident light, to make at least one liquid crystal grating module change the propagation direction of the incident light, and at least one liquid crystal grating module do not change the propagation direction of the incident light within a preset duration.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

Figure 1:
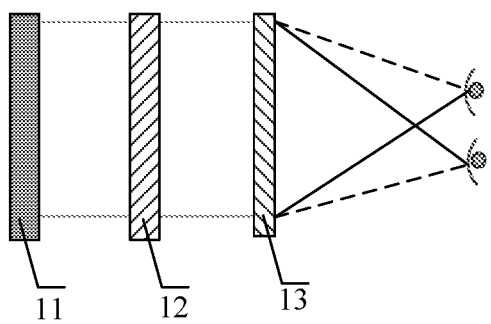
FIG. 1 illustrates a schematic diagram of a holographic display system.

FIG. 1 illustrates a schematic diagram of a holographic display system. Referring to FIG. 1, the holographic display system includes a backlight module 11, a spatial light modulator 12 and a liquid crystal grating module 13 that are arranged in sequence.

The backlight module 11 is configured to emit a backlight beam, which includes at least a red backlight sub-beam, a green backlight sub-beam, and a blue backlight sub-beam that are emitted in a time-sharing mode. The spatial light modulator 12 is configured to modulate phase and amplitude of the backlight beam. The liquid crystal grating module 13 forms a left-eye image and a right-eye image based on incident light.

For the holographic display system shown in FIG. 1, merely one liquid crystal grating module 13 is used to deflect the propagation direction of the light, which requires the liquid crystal grating module 13 to have a substantially high screen refresh rate. Specifically, if both the left eye and the right eye perceive the screen refresh rate of a first preset frequency, the liquid crystal grating module 13 needs to have a screen refresh rate of a second preset frequency. The second preset frequency is six times the first preset frequency. Because the liquid crystal grating module 13 needs to form the left-eye image and the right-eye image, and both each frame of the left-eye image and each frame of the right-eye image include a red sub-image, a green sub-image and a blue sub-image. The refresh rate of each color sub-image is the first preset frequency, the refresh frequencies of the left-eye image and the right-eye image are three times the first preset frequency. However, the liquid crystal grating module 13 needs to display the left-eye image and the right-eye image in a time-sharing mode, such that the screen refresh rate of the liquid crystal grating module 13 needs to be six times the first preset frequency.

To make both the left eye and the right eye perceive a 60 Hz image, the screen refresh rate of the liquid crystal grating module 13 shown in FIG. 1 needs to be 360 Hz. The holographic display system has a substantially high requirements on the screen refresh rate of the liquid crystal grating module 13.

The screen refresh rate of the liquid crystal grating module 13 is often reduced by sacrificing the perception frequency of the human eye. In other words, by reducing the first preset frequency, the second preset frequency is reduced, thereby reducing the screen refresh rate of the liquid crystal grating module 13. However, the too-low first preset frequency will cause flickering and shaking of the display screen, thereby affecting the display quality. The first preset frequency is reduced to 40 Hz at most, and further reducing the first preset frequency will lead to severe flickering and shaking problems.

The first preset frequency and the second preset frequency are a contradiction. If the first preset frequency is increased, the image display quality will be improved, but the second preset frequency will be greatly increased, thereby greatly increasing the requirements on the screen refresh rate of the liquid crystal grating module 13. If the first preset frequency is reduced, the requirements on the screen refresh rate of the liquid crystal grating module 13 will be reduced, while which will affect the image display quality. Therefore, the only choice is to make a compromise between the first preset frequency and the second preset frequency, and the first preset frequency is often set as 60 Hz.

The present disclosure provides a holographic display system, a holographic display method, and an electronic device. In the holographic display system, a plurality of liquid crystal grating modules may be provided, and within a preset duration, at least one liquid crystal grating module may change a propagation direction of the incident light, and at least one liquid crystal grating module may not change the propagation direction of the incident light through at least one first optical rotator. In view of this, at a same moment, at least one of the liquid crystal grating module may deflect the propagation direction of the incident light, and at least one of the liquid crystal grating module may not need to deflect the propagation direction of the incident light, thereby reducing the screen refresh rate of the liquid crystal grating module.

Further, the holographic display system may include N liquid crystal grating modules, and N may be a positive integer greater than one. During a duration of displaying one frame of the monochrome sub-image, merely one liquid crystal grating module may deflect the propagation direction of the incident light, and any other liquid crystal grating module may not need to deflect the propagation direction of the incident light. The second frequency may be realized through the N liquid crystal grating modules together, and then the screen refresh rate of a single liquid crystal grating module may be reduced to 1/N of the second frequency.

Figure 2:
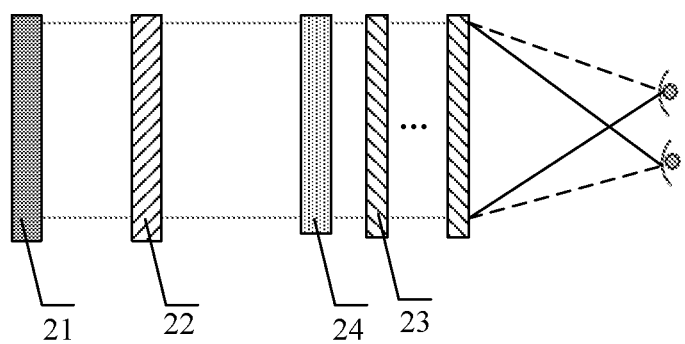
FIG. 2 illustrates a schematic diagram of an exemplary holographic display system consistent with disclosed embodiments of the present disclosure.

FIG. 2 illustrates a schematic diagram of a holographic display system consistent with disclosed embodiments of the present disclosure. Referring to FIG. 2, the holographic display system may include a backlight module 21, a spatial light modulator 22, and a plurality of liquid crystal grating modules 23 that are sequentially arranged in a first direction Z.

The backlight module 21 may be configured to emit a backlight beam. The first direction Z may be parallel to the propagation direction of the backlight emitted by the backlight module 21. The spatial light modulator 22 may be configured to modulate the phase and amplitude of the backlight beam. The plurality of liquid crystal grating modules 23 may be sequentially disposed in the first direction Z. Based on the polarization direction of the incident light, the liquid crystal grating module 23 may be capable of changing the propagation direction of the incident light or maintaining the propagation direction of the incident light. In other words, any liquid crystal grating module 23 may be capable of deflecting the propagation direction of the light incident on the liquid crystal grating module 23, or maintaining the propagation direction of the light incident on the liquid crystal grating module 23.

A first optical rotator 24 may be disposed on a light-incident side of at least one liquid crystal grating module 23, and the first optical rotator 24 may be capable of rotating the polarization direction of the incident light. Therefore, within a preset duration, at least one liquid crystal grating module 23 may change the propagation direction of the incident light, and at least one liquid crystal grating module 23 may not change the propagation direction of the incident light. The preset duration may include a display time period for the holographic display system to display a frame of the monochrome sub-image.

The disclosed holographic display system may include the first optical rotator 24 capable of adjusting the polarization direction of light. Through the first optical rotator 24, the polarization direction of the light incident on each liquid crystal grating module 23 may be adjusted. Therefore, within the preset duration, at least one liquid crystal grating module 23 may change the propagation direction of the incident light, and at least one liquid crystal grating module 23 may not change the propagation direction of the incident light. In view of this, at a same moment, at least one of the liquid crystal grating modules may deflect the propagation direction of the incident light, and at least one of the liquid crystal grating modules may not need to deflect the propagation direction of the incident light, thereby reducing the screen refresh rate of the liquid crystal grating module.

For the holographic display system with a single liquid crystal grating module 13 shown in FIG. 1, if the single liquid crystal grating module 13 needs to refresh 360 frames of the monochrome sub-images within one second (in other words, the screen refresh frequency is 360 Hz), in the disclosed holographic display system, the 360 frames of the monochrome sub-images may be refreshed within one second through multiple liquid crystal grating modules 23. If there are two liquid crystal grating modules 23, within the duration of displaying one frame of the monochrome sub-image, one liquid crystal grating module 23 may change the propagation direction of the incident light, and the other one liquid crystal grating module 23 may not change the propagation direction of the incident light. The two liquid crystal grating module 23 may alternately deflect the propagation direction of light, and each liquid crystal grating module 23 may refresh 180 frames of the monochrome sub-images within one second. The screen refresh rate of each liquid crystal grating module 23 may be 180 Hz. Compared with the manner shown in FIG. 1, the screen refresh rate of the liquid crystal grating module 23 may be reduced by half.

If there are three liquid crystal grating modules 23, within the duration of displaying one frame of monochrome sub-image, one liquid crystal grating module 23 may change the propagation direction of the incident light, and the other two liquid crystal grating modules 23 may not change the propagation direction of the incident light. The three liquid crystal grating module 23 may alternately deflect the propagation direction of light, and each liquid crystal grating module 23 may refresh 120 frames of monochrome sub-images within one second. The screen refresh rate of each liquid crystal grating module 23 may be 120 Hz. Compared with the manner shown in FIG. 1, the screen refresh rate of the liquid crystal grating module 23 may be reduced by two-thirds.

The disclosed holographic display system may greatly reduce the screen refresh rate of the liquid crystal grating module 23, thereby lowering the requirements on the screen refresh rate of the liquid crystal grating module 23.

In one embodiment, the first optical rotator 24 may include a first operating mode and a second operating mode. In the first operating mode, the incident light may pass through the first optical rotator 24 while keeping the polarization direction. In the second operating mode, after the incident light passes through the first optical rotator 24, the polarization direction may be rotated by a preset angle.

In the first operating mode, the first optical rotator 24 may make the incident light maintain the polarization direction and then pass through the first optical rotator 24. In the second operating mode, the first optical rotator 24 may make the incident light have the polarization direction rotated by (n−1)*180°+90° and then pass through the first optical rotator 24. In other words, the preset angle may be (n−1)*180°+90°, where n may be a positive integer, and a direction of the rotation axis may be perpendicular to the plane where the first optical rotator 24 is located. The direction of the rotation axis may be parallel to the first direction Z.

The first optical rotator 24 may include the first operating mode and the second operating mode. By switching the operating modes of the first optical rotator 24, whether each liquid crystal grating module 23 deflects the propagation direction of the incident light may be controlled by choosing whether to change the polarization direction of the light passing through the first optical rotator 24. Therefore, within the preset duration, at least one liquid crystal grating module 23 may change the propagation direction of the incident light, and at least one liquid crystal grating module 23 may not change the propagation direction of the incident light, thereby reducing the screen refresh rate of the liquid crystal grating module 23.

Figure 3:
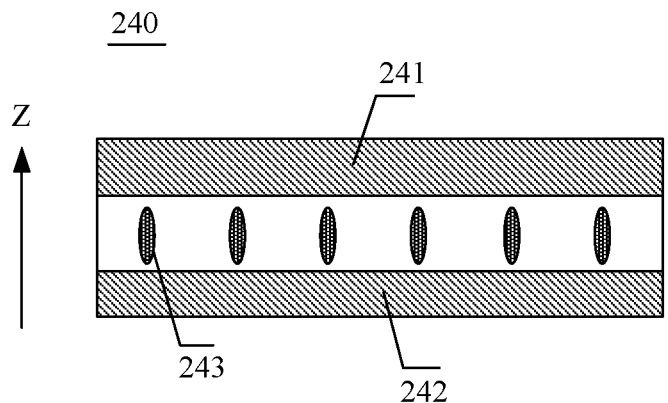
FIG. 3 illustrates a cross-sectional view of a liquid crystal optical rotator of an exemplary holographic display system consistent with disclosed embodiments of the present disclosure.

FIG. 3 illustrates a cross-sectional view of a liquid crystal optical rotator of a holographic display system consistent with disclosed embodiments of the present disclosure. Referring to FIG. 2 and FIG. 3, the cross-sectional plane may be parallel to the first direction Z. The first optical rotator 24 may include at least one liquid crystal optical rotator 240. The liquid crystal optical rotator 240 may include a first electrode layer 241 and a second electrode layer 242 that are oppositely arranged, and a first liquid crystal layer 243 disposed between the first electrode layer 241 and the second electrode layer 242. The liquid crystal optical rotator 240 may include an electronically controlled birefringent liquid crystal cell (ECB).

Both the first electrode layer 241 and the second electrode layer 242 may be a full-layer transparent electrode layer. A first alignment layer may be disposed between the first liquid crystal layer 243 and each of the first electrode layer 241 and the second electrode layer 242, such that the liquid crystal molecules in the first liquid crystal layer 243 may have a desired initial alignment direction.

A preset control voltage may be applied through the first electrode layer 241 and the second electrode layer 242 to adjust the state of the liquid crystal molecules in the first liquid crystal layer 243, thereby determining whether to rotate the polarization direction of the transmitted light. The holographic display system may be provided with a controller, and the controller may be connected to the electrode layers of the liquid crystal optical rotator 240. The controller may provide different control voltages for the liquid crystal optical rotator 240 to control the rotation of the liquid crystal molecules, and then automatically control the first optical rotator 24 to be in the first operating mode or the second operating mode.

In the first operating mode, the controller may be configured to provide the first control voltage for the first electrode layer 241 and the second electrode layer 242, such that a long axis of the liquid crystal molecule as shown in FIG. 3 may be perpendicular to the plane where the first optical rotator 24 is located. The plane where the first optical rotator 24 is located may be perpendicular to the first direction Z. In view of this, the long axis of the liquid crystal molecule in the liquid crystal optical rotator 240 may be parallel to the first direction Z, and the light may pass through the liquid crystal optical rotator 240 without changing the polarization direction.

In the present disclosure, one item being perpendicular to another item may refer to that the angle between the two items may be exactly 90° or approximately 90°, and one item being parallel to another item may refer to that the angle between the two items may be exactly 0° or approximately 0°.

In the second operating mode, the controller may be configured to provide a second control voltage for the first electrode layer 241 and the second electrode layer 242, such that the angle between the long axis of the liquid crystal molecule and the plane where the first optical rotator 24 is located may be greater than or equal to 0° and less than 90°. The first control voltage may be different from the second control voltage. In view of this, the liquid crystal optical rotator 240 may rotate the polarization direction of the incident light, such that the polarization direction of the light passing through the liquid crystal optical rotator 240 may be rotated.

In one embodiment, by providing a corresponding control voltage for the first electrode layer 241 and the second electrode layer 242 through the controller, whether the liquid crystal optical rotator 240 changes the polarization direction of the transmitted light may be automatically controlled, thereby automatically selecting the operating mode of the first optical rotator 24.

The backlight module 21 may at least emit a red backlight sub-beam, a green backlight sub-beam, and a blue backlight sub-beam in a time-sharing mode, such that the holographic display system may perform colorful 3D holographic display based on the red, green and blue three primary color backlight. The backlight module may also emit a backlight sub-beam with any other color that is time-shared with the sub-beams of the three primary colors. The backlight sub-beam with any other color may include a white backlight sub-beam for adjusting display brightness, and/or a preset color backlight sub-beam for adjusting display hue, where the preset color backlight may be different from the red backlight, the blue backlight and the green backlight.

The first optical rotator 24 may need to rotate the backlight sub-beams with different colors. Because the wavelengths of red light, green light and blue light are different from each other, when the first optical rotator 24 includes one liquid crystal optical rotator 240, if the liquid crystal optical rotator 240 uses the same first control voltage and second control voltage for each color backlight sub-beam to perform the mode control, a deviation in the rotation angle of the polarization direction of the light in the second operating mode may occur.

Figure 4:
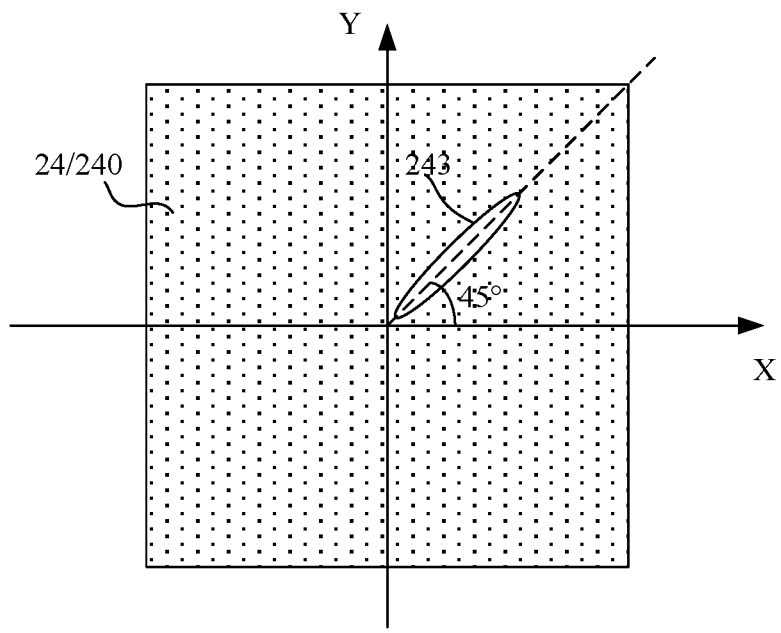
FIG. 4 illustrates a principle schematic diagram of rotating a polarization direction of light by a first optical rotator with one liquid crystal optical rotator.

FIG. 4 illustrates a principle schematic diagram of rotating a polarization direction of light by a first optical rotator with one liquid crystal optical rotator. Referring to FIG. 4, the plane where the first optical rotator 24 with one liquid crystal optical rotator 240 is located may be parallel to the XY plane of the Cartesian coordinate system. An angle between the alignment direction of the first alignment layer in the liquid crystal optical rotator 240 (shown by the dotted line in FIG. 4) with each of the X-axis and Y-axis of the Cartesian coordinate system may be 45°. In the second operating mode, the polarization direction of the incident light may be rotated by 90°.

In the manner shown in FIG. 4, taking the red backlight sub-beam as an example, the polarization direction of the red backlight sub-beam before being rotated may be parallel to the X axis, and the polarization direction of the red backlight sub-beam before being rotated may be decomposed into a first component and a second component that are vertical to each other.

In the case without power, in the second operating mode, the long axis of the liquid crystal molecule may be parallel to the alignment direction of the first alignment layer, in other words, may be parallel to the XY plane. The first component of the incident light may be parallel to the long axis of the liquid crystal molecule, and the second component may be perpendicular to the long axis of the liquid crystal molecule. The liquid crystal optical rotator 240 may make the two components produce a half-wavelength phase difference, such that the polarization direction of the exiting light may be rotated by 90° with respect to the incident light. As shown in FIG. 4, the polarization direction of the red backlight sub-beam after being rotated and the polarization direction of the red backlight sub-beam before being rotated may be symmetrical based on the alignment direction of the first alignment layer, and the polarization direction of the red backlight sub-beam after being rotated may be parallel to the Y axis.

In the case with power, in the first operating mode, the long axis of the liquid crystal molecule may be perpendicular to the XY plane. In view of this, both the first component and the second component of the incident light may be perpendicular to the long axis of the liquid crystal molecule. In view of this, the liquid crystal optical rotator 240 may produce zero phase difference, which may maintain the polarization direction of the light, and the polarization directions of the exiting light and the incident light may be the same.

Although in the first operating mode, by applying a sufficiently large first control voltage, in the turn-on period of each different color backlight, the liquid crystal optical rotator 240 may make the long axis of the liquid crystal molecule perpendicular to the XY plane based on the same first control voltage, such that various backlights with different wavelengths may maintain the polarization direction of the light. However, in the second operating mode, when the power is not applied, the second control voltage may be zero. Because the phase difference corresponding to the optical rotation angle of the liquid crystal molecule is related to the wavelength of the incident light, when the red backlight sub-beam achieves 90° optical rotation, the other two backlights cannot achieve accurate 90° optical rotation. To solve such problem, the first optical rotator 24 may include a plurality of liquid crystal optical rotators 240.

When the first optical rotator 24 includes a plurality of liquid crystal optical rotators 240, the liquid crystal optical rotators 240 in the first optical rotator 24 may respectively make the polarization direction of the incident light rotate by a corresponding angle based on a same rotation direction, and the angle may be positively related to the first angle. The first angle may be the angle between the alignment direction of the first liquid crystal layer in the liquid crystal optical rotator and the polarization direction of the light incident on the liquid crystal optical rotator 240. In the first optical rotator 24, every liquid crystal optical rotator 240 may respectively rotate the corresponding incident light by a corresponding angle based on the same incident direction. A sum of the optical rotation angles of all the liquid crystal optical rotators 240 may be equal to the above-mentioned preset angle, and the preset angle may be $(n-1)*180°+90°$. Any two liquid crystal optical rotators 240 in the first optical rotator 24 may correspond to different optical rotation angles.

The first optical rotator 24 may include the plurality of liquid crystal optical rotators 240. In the first operating mode, each liquid crystal optical rotator 240 may adopt a same first control voltage, such that the long axis of the liquid crystal molecule may be perpendicular to the plane where the first optical rotator 24 is located, in other words, may be perpendicular to the XY plane, and each liquid crystal optical rotator 240 may maintain the polarization direction of the light. In the second mode, each liquid crystal optical rotator 240 may adopt a same second control voltage. In view of this, the second control voltage may be zero, the long axis of the liquid crystal molecule may be parallel to the plane where the first optical rotator 24 is located, and may be parallel to the alignment direction of the first liquid crystal layer, such that each incident light may be rotated by a corresponding angle. In this manner, each liquid crystal optical rotator 240 may control the operating mode by the same first control voltage and the same second control voltage, and may accurately control the optical rotation angle of the backlight sub-beam of each color.

Figure 5:
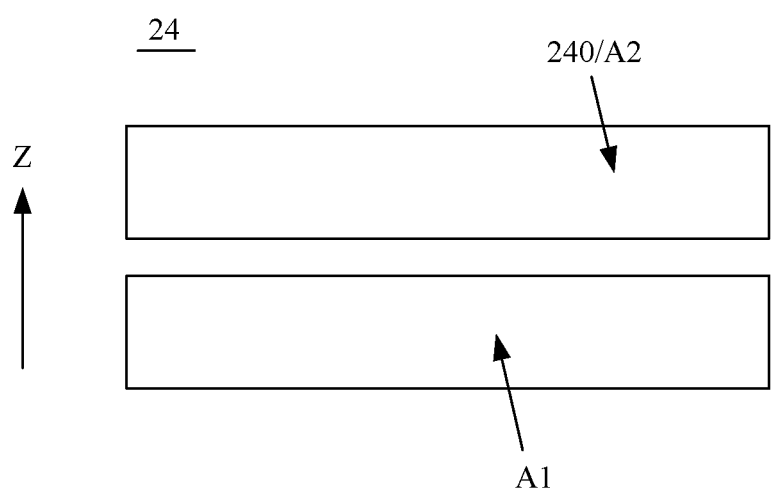
FIG. 5 illustrates a cross-sectional view of a first optical rotator of an exemplary holographic display system consistent with disclosed embodiments of the present disclosure.
Figure 6:
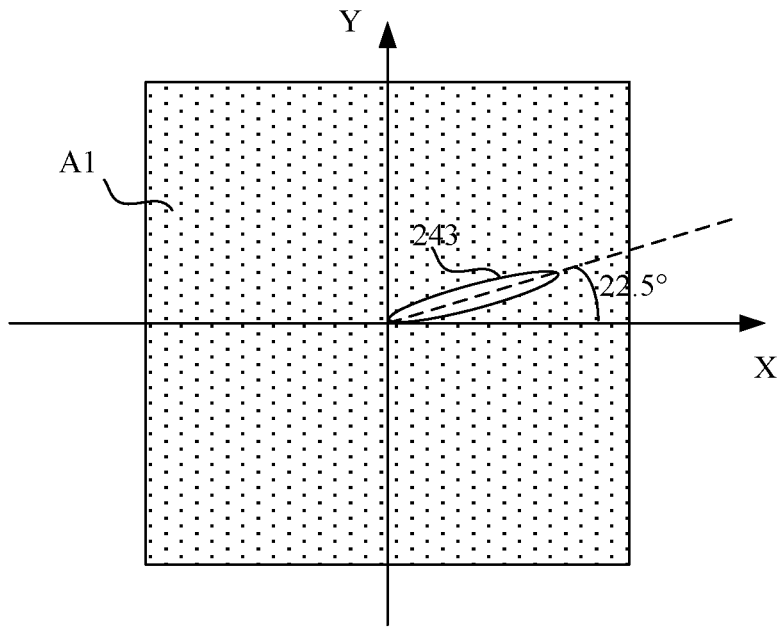
FIG. 6 illustrates a schematic diagram of a liquid crystal optical rotator of the first optical rotator in FIG. 5 consistent with disclosed embodiments of the present disclosure.
Figure 7:
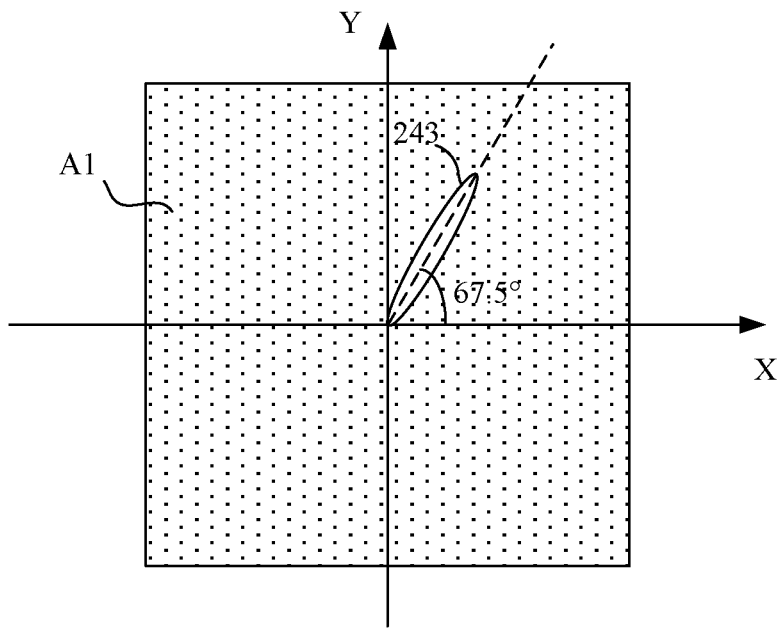
FIG. 7 illustrates a schematic diagram of another liquid crystal optical rotator of the first optical rotator in FIG. 5 consistent with disclosed embodiments of the present disclosure.

FIG. 5 illustrates a cross-sectional view of the first optical rotator; FIG. 6 illustrates a schematic diagram of the liquid crystal optical rotator of the first optical rotator in FIG. 5; and FIG. 7 illustrates a schematic diagram of another liquid crystal optical rotator of the first optical rotator in FIG. 5. Referring to FIGS. 5-7, in view of this, the first optical rotator 24 may include two liquid crystal optical rotators 240. In the XY coordinate system, the two liquid crystal optical rotators may include a first liquid crystal optical rotator A1 and a second liquid crystal optical rotator A2 sequentially disposed along the first direction Z. The XY plane may be parallel to the plane where the first optical rotator 24 is located, and the polarization direction of the light incident on the first optical rotator 24 may be parallel to the X axis.

As shown in FIG. 6, an angle between the alignment direction of the first liquid crystal layer 243 in the first liquid crystal optical rotator 240 and a positive direction of the X axis may be 22.5°. As shown in FIG. 7, an angle between the alignment direction of the first liquid crystal layer 243 in the second liquid crystal optical rotator 240 and the positive direction of the X axis may be 67.5°. The polarization direction of the light incident on the first optical rotator 24 may be parallel to the X axis. After being rotated by the first liquid crystal optical rotator A1, the polarization direction of the light after performing the optical rotation and the polarization direction of the light before performing the optical rotation may be symmetrical with respect to the alignment direction shown by the dotted line in FIG. 6. Therefore, an angle between the polarization direction of the exiting light after being rotated by the first liquid crystal optical rotator A1 and the X axis may be 45°. An angle between the polarization direction of the light incident on the second liquid crystal optical rotator A2 and an alignment direction shown by the dotted line in FIG. 7 may be 22.5°. After being rotated by the second liquid crystal optical rotator A2, the polarization directions of the emitting light and the incident light may be symmetrical with respect to the alignment direction shown by the dotted line in FIG. 7. Therefore, the polarization direction of the exiting light after being rotated by the second liquid crystal optical rotator A2 may be parallel to the Y axis. Based on the first optical rotator 24 shown in FIGS. 5-7, in the case without power and in the second operating mode, the polarization direction of light may be rotated by 90°.

When the first optical rotator 24 includes the plurality of liquid crystal optical rotators 240, the quantity of the liquid crystal optical rotators 240 and the alignment direction of the first liquid crystal layer 243 in each liquid crystal optical rotator 240 may not be limited to the manner shown in FIGS. 5-7. The quantity of the liquid crystal optical rotators 240 and the alignment direction of the first liquid crystal layer 243 in each liquid crystal optical rotator 240 may be determined according to practical applications, as long as the polarization directions of the incident light and exiting light of the first optical rotator 24 may be rotated by a desired angle in the second operating mode.

In another embodiment, the first optical rotator 24 may include one liquid crystal optical rotator 240 as shown in FIG. 4, and the angle between the alignment direction of the first liquid crystal layer 243 in the liquid crystal optical rotator 240 and the polarization direction of the incident light may be 45°. The disposure of one liquid crystal optical rotator 240 in the first optical rotator 24, the structure of the holographic display system may be simple, and the size of the first optical rotator 24 in the first direction Z may be reduced.

The backlight module 21 may be capable of emitting multiple backlight sub-beams with different colors in a time-sharing mode. The backlight module 21 may at least emit the red backlight sub-beam, the green backlight sub-beam, and the blue backlight sub-beam in a time-sharing mode.

Regardless of whether the first optical rotator 24 includes a plurality of liquid crystal optical rotators 240 or one liquid crystal optical rotator 240, when being in the first operating mode, the controller may be configured to provide the same first control voltage for the liquid crystal optical rotators 240 during the turn-on periods of backlight sub-beams with different colors; when being in the second operating mode, the controller may be configured to provide the same second control voltage for the liquid crystal optical rotator 240 during the turn-on periods of the backlight sub-beams with different colors, and the second control voltage may be zero. In view of this, the long axis of the liquid crystal molecule in the liquid crystal optical rotator 240 may be controlled to be perpendicular to the XY plane in the first operating mode through the same first control voltage, and the long axis of the liquid crystal molecule may be controlled to be parallel to the XY plane through the same second control voltage. The control voltage sequence of the liquid crystal optical rotator 240 may be simple, and the control method may be simple.

When the first optical rotator 24 includes one liquid crystal optical rotator 240, in the second operating mode, if the backlight of each color adopts zero voltage as the second control voltage, the optical rotation angle may be inaccurate. In view of this, when in the first operating mode, the controller may be configured to provide the same first control voltage for the liquid crystal optical rotator 240 during the turn-on periods of the backlight sub-beams of different colors, such that the long axis of the liquid crystal molecule may be perpendicular to the XY plane, and each color backlight may maintain the polarization direction in the first operating mode to pass through the liquid crystal optical rotator 240. When in the second operating mode, the controller may be configured to provide different second control voltages for the liquid crystal optical rotator during the turn-on periods of the backlight sub-beams of different colors. In the second operating mode, each color backlight may have a corresponding second control voltage during the turn-on period, to control the long axis of the liquid crystal molecule to have an adapted deflection angle with respect to the alignment direction, such that each color backlight may be accurately rotated by the preset angle.

When the first optical rotator 24 includes one liquid crystal optical rotator 240, the principle of adjusting the polarization direction of each color backlight in the first operating mode and the second operating mode may be shown in FIGS. 8-13.

FIGS. 8-13 illustrate schematic diagrams of an operating principle of a liquid crystal optical rotator of a holographic display system consistent with disclosed embodiments of the present disclosure. Referring to FIGS. 8-13, the backlight module 21 may emit at least a red backlight sub-beam, a green backlight sub-beam, and a blue backlight sub-beam in a time-sharing mode.

Figure 8:
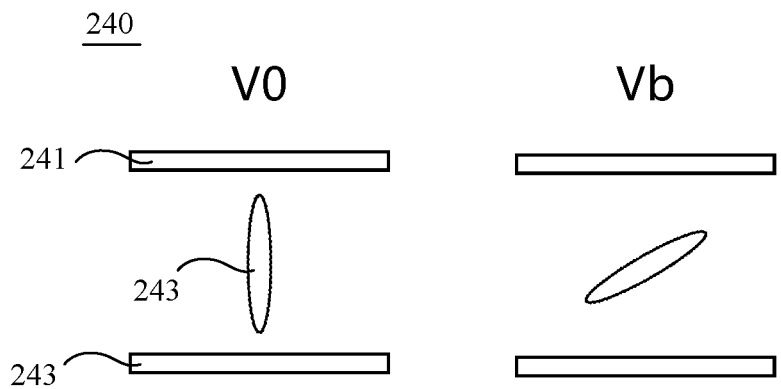
FIGS. 8-13 illustrate schematic diagrams of an operating principle of a liquid crystal optical rotator of an exemplary holographic display system consistent with disclosed embodiments of the present disclosure.
Figure 9:
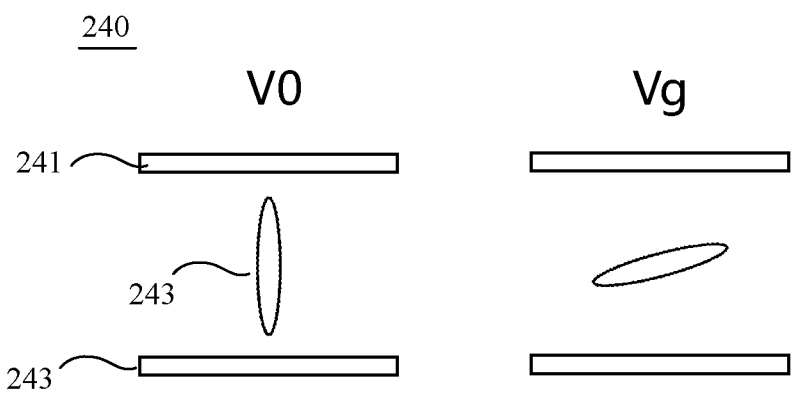
Figure 10:
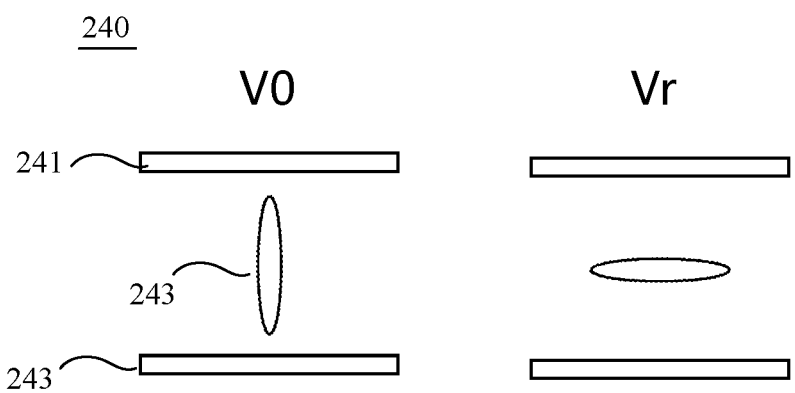
Figure 11:
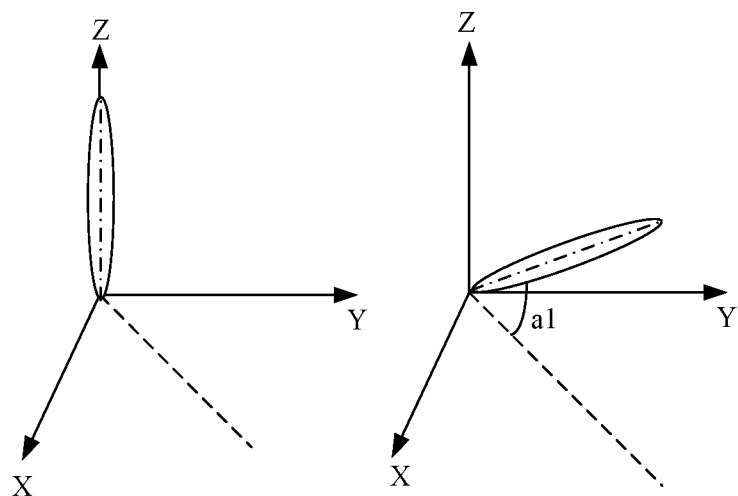
Figure 12:
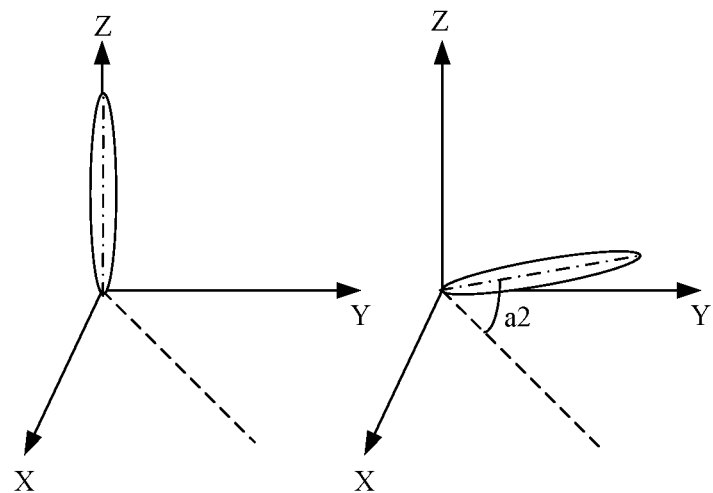
Figure 13:
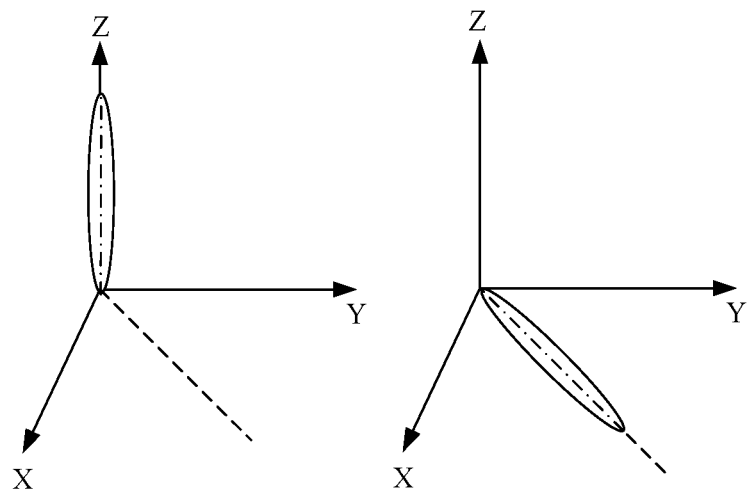

FIG. 8 may be configured to illustrate a principle schematic diagram of the liquid crystal optical rotator 240 controlling the polarization direction of the blue backlight sub-beam, FIG. 9 may be configured to illustrate a principle schematic diagram of the liquid crystal optical rotator 240 controlling the polarization direction of the green backlight sub-beam, and FIG. 10 may be configured to illustrate a principle schematic diagram of the liquid crystal optical rotator 240 controlling the polarization direction of the red backlight sub-beam. FIG. 11 illustrates a schematic diagram of the states of liquid crystal molecules in the manner shown in FIG. 8 in different operating modes, FIG. 12 illustrates a schematic diagram of the states of liquid crystal molecules in the manner shown in FIG. 9 in different operating modes, and FIG. 13 illustrates a schematic diagram of the states of liquid crystal molecules in the manner shown in FIG. 10 in different operating modes. In the FIGS. 8-13, the left diagrams may be configured to illustrate the deflection state of the liquid crystal molecule in the first operating mode, and the right diagrams may be configured to illustrate the deflected state of the liquid crystal molecule in the second operating mode. In the three-dimensional Cartesian coordinate system XYZ, the first direction Z may correspond to a positive direction of the Z axis.

In FIGS. 11-13, the alignment direction of the first liquid crystal layer 243 may be indicated by a dashed line, and the long axis of the liquid crystal molecule may be indicated by a dotted line. The alignment direction of the first liquid crystal layer 243 may be controlled through the alignment direction of the first alignment layer. In the liquid crystal optical rotator 240, the alignment directions of the two first alignment layers that are oppositely disposed may be parallel.

In the first operating mode, a first control voltage of the liquid crystal optical rotator 240 may be the first preset voltage V0 during the turn-on period of the blue backlight sub-beam, the turn-on period of the green backlight sub-beam and the turn-on period of the red backlight sub-beam, as shown in the left diagrams in FIGS. 8-13, such that the long axis of the liquid crystal molecule may be perpendicular to the above-mentioned XY plane. The first preset voltage V0 may be approximately 20V.

In the second operating mode, the second control voltages of the liquid crystal optical rotator 240 corresponding to the turn-on period of the blue backlight sub-beam, the turn-on period of the green backlight sub-beam and the turn-on period of the red backlight sub-beam may decrease successively. The second control voltage corresponding to the turn-on period of the blue backlight sub-beam may be a second preset voltage Vb, the second control voltage corresponding to the turn-on period of the green backlight sub-beam may be a third preset voltage Vg, and the second control voltage corresponding to the turn-on period of the red backlight sub-beam may be a fourth preset voltage Vr, where Vb>Vg>Vr, and the fourth preset voltage Vr may be zero.

As shown in the right diagrams in FIGS. 8-13, based on Vb>Vg>Vr, during the turned-on period of the blue backlight sub-beam, the long axis of the liquid crystal molecule may have a deflection angle of a1 with respect to the alignment direction, and a vertical projection of the long axis of the liquid crystal molecule on the XY plane may be parallel to the alignment direction. During the turned-on period of the green backlight sub-beam, the long axis of the liquid crystal molecule may have a deflection angle of a2 with respect to the alignment direction, and a vertical projection of the long axis of the liquid crystal molecule on the XY plane may be parallel to the alignment direction. During the turn-on period of the red backlight sub-beam, the long axis of the liquid crystal molecule may have a deflection angle of 0° with respect to the alignment direction, and the long axis of the liquid crystal molecule may be located in the XY plane and parallel to the alignment direction. In view of this, the second control voltage may be negatively correlated with the backlight wavelength, such that every different color backlight sub-beam may have a second control voltage adapted to the wavelength, and each color backlight sub-beam may achieve accurate rotation control of the polarization direction.

Figure 14:
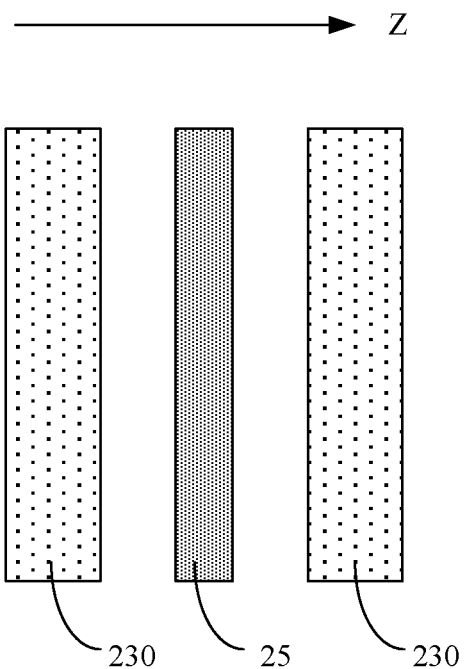
FIG. 14 illustrates a schematic diagram of a liquid crystal grating module of an exemplary holographic display system consistent with disclosed embodiments of the present disclosure.

FIG. 14 illustrates a schematic diagram of a liquid crystal grating module of a holographic display system consistent with disclosed embodiments of the present disclosure. Referring to FIG. 14, the liquid crystal grating module 23 may include a plurality of liquid crystal gratings 230 sequentially arranged in the first direction Z, and the alignment directions of the liquid crystal gratings 230 may be different from each other. In a same liquid crystal grating module 23, a second optical rotator 25 may be disposed between two adjacent liquid crystal gratings 230. In the same liquid crystal grating module 23, for any two adjacent liquid crystal gratings 230 in the first direction Z, the second optical rotator 25 may be configured to rotate the polarization direction of the light exiting from the previous liquid crystal grating 230, such that the polarization direction of the light may be parallel to the alignment direction of the next liquid crystal grating 230, or the polarization direction of the light may be perpendicular to the alignment direction of the next liquid crystal grating 230.

In the same liquid crystal grating module 23, for any two adjacent liquid crystal gratings 230 in the first direction Z, by disposing the second optical rotator 25 between two adjacent liquid crystal gratings 230, the polarization direction of the light incident on the next liquid crystal grating 230 may be controlled to be perpendicular to or parallel to the alignment direction of the next liquid crystal grating 230, to control whether the propagation direction of the light is deflected, such that within the preset duration, at least one liquid crystal grating module 23 may change the propagation direction of the incident light, and at least one liquid crystal grating module 23 may not change the propagation direction of the incident light.

Figure 15:
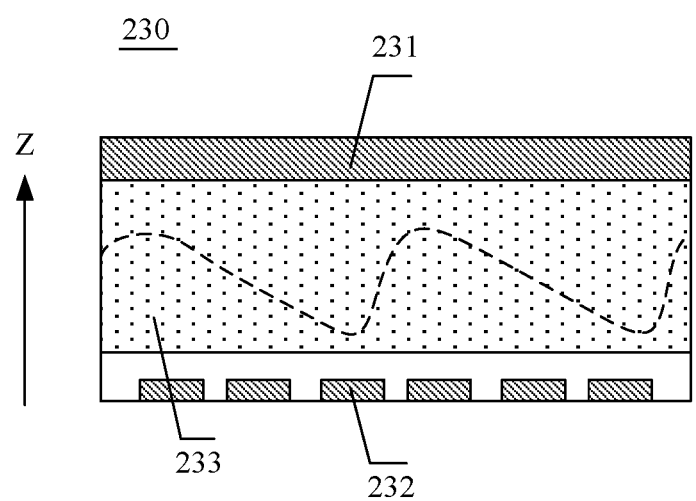
FIG. 15 illustrates a schematic diagram of a liquid crystal grating of an exemplary holographic display system consistent with disclosed embodiments of the present disclosure.

FIG. 15 illustrates a schematic diagram of the liquid crystal grating of a holographic display system consistent with disclosed embodiments of the present disclosure. Referring to FIG. 15, the liquid crystal grating 230 may include a first control electrode 231 and a second control electrode 232 that are arranged oppositely, and a second liquid crystal layer 233 between the first control electrode 231 and the second control electrode 232. The first control electrode 231 may include a whole transparent electrode layer, and the second control electrode 232 may include a plurality of strip-shaped electrodes that are arranged in parallel. A second alignment layer may be disposed between the second liquid crystal layer 233 and each of the first control electrode 231 and the second control electrode 232. The alignment direction of the second liquid crystal layer 233 may be controlled by the alignment direction of the second alignment layer. In the liquid crystal grating 230, the alignment directions of the two oppositely disposed second alignment layers may be parallel to each other.

Based on the liquid crystal grating 230 shown in FIG. 15, by controlling the voltages of the strip electrodes, the refractive index of the second liquid crystal layer 233 may be periodically changed as shown by the dotted curve in FIG. 15. Along a direction perpendicular to an extension direction of the strip-shaped electrode, the refractive index of the second liquid crystal layer 233 may have a plurality of alternating maxima and minima, and the refractive index between adjacent maximum and minimum may change sequentially and continuously.

The polarization direction of the light incident on the liquid crystal grating 230 may be controlled by the first optical rotator 24. If the alignment direction of the liquid crystal grating 230 (in other words, the alignment direction of the second liquid crystal layer 233) is parallel to the polarization direction of the incident light, the propagation direction of the light may be deflected. If the alignment direction of the liquid crystal grating 230 is perpendicular to the polarization direction of the incident light, the propagation direction of the light may be maintained.

Figure 16:
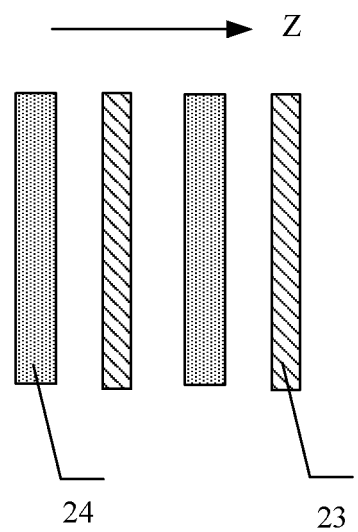
FIG. 16 illustrates a schematic diagram of a layout of a first optical rotator and a liquid crystal grating module of an exemplary holographic display system consistent with disclosed embodiments of the present disclosure.

FIG. 16 illustrates a schematic diagram of a layout of a first optical rotator and a liquid crystal grating module of a holographic display system consistent with disclosed embodiments of the present disclosure. Referring to FIG. 16, in one embodiment, one first optical rotator 24 may be disposed on the light-incident side of the liquid crystal grating module 23. Each liquid crystal grating module 23 may correspond to one first optical rotator 24 independently, and the polarization direction of the light incident on the corresponding liquid crystal grating module 23 may be independently controlled through the first optical rotator 24, to determine whether the propagation direction of the light to be deflected or not to be deflected after passing through the liquid crystal grating module 23. Such control method may be simple.

In the manner shown in FIG. 16, two liquid crystal grating modules 23 may be used as an example for illustration, and one first optical rotator 24 may be correspondingly disposed on the light-incident side of each liquid crystal grating module 23. In the present disclosure, the quantity of liquid crystal grating modules 23 in the holographic display system may not be limited. The larger the quantity of the liquid crystal grating modules 23, the lower the screen refresh rate of the liquid crystal grating modules 23 within a unit time (such as one second). To take into account both the screen refresh rate of the liquid crystal grating module 23 and the size of the holographic display system in the first direction Z, the quantity of the liquid crystal grating modules 23 may be less than or equal to two.

Figure 17:
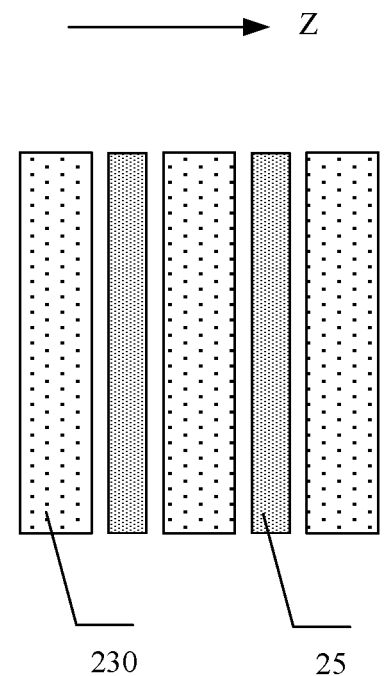
FIG. 17 illustrates a schematic diagram of another liquid crystal grating module of an exemplary holographic display system consistent with disclosed embodiments of the present disclosure.
Figure 18:
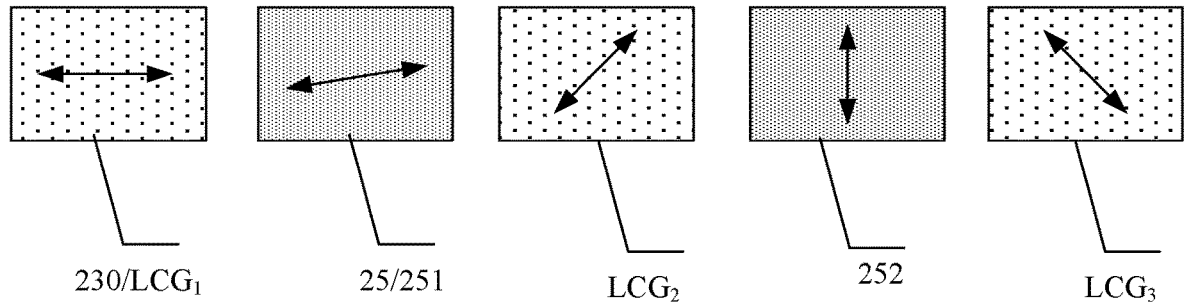
FIG. 18 illustrates a top view of a liquid crystal grating module where each liquid crystal grating has an alignment direction facing towards a first direction.
Figure 19:
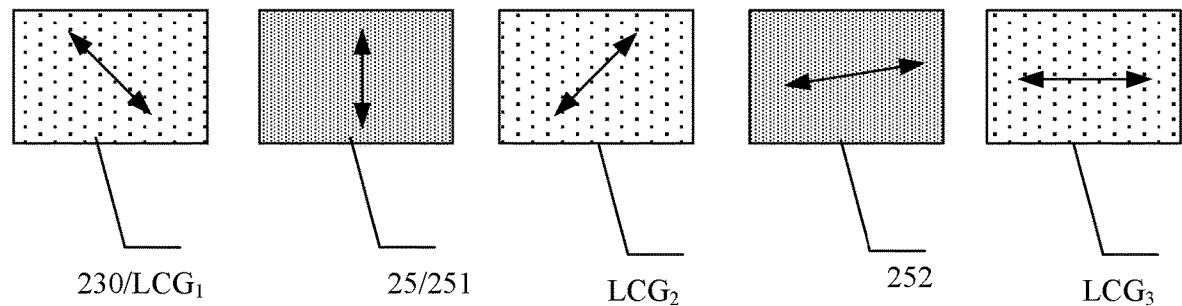
FIG. 19 illustrates a top view of another liquid crystal grating module where each liquid crystal grating has an alignment direction facing towards a first direction.

FIG. 17 illustrates a schematic diagram of another liquid crystal grating module of a holographic display system consistent with disclosed embodiments of the present disclosure; FIG. 18 illustrates a top view of a liquid crystal grating module where each liquid crystal grating has an alignment direction facing towards the first direction; and FIG. 19 illustrates a top view of another liquid crystal grating module where each liquid crystal grating has an alignment direction facing towards the first direction. FIG. 18 and FIG. 19 may correspond to two adjacent liquid crystal grating modules 23 in the first direction Z. The top view shown in FIG. 18 and FIG. 19 may be parallel to the XY plane. Referring to FIGS. 17-19, the second optical rotator 25 may include a wave plate. The solid bidirectional arrow in the liquid crystal grating 230 may represent the alignment direction of the liquid crystal grating 230, and the solid bidirectional arrow in the second optical rotator 25 may represent the optical axis of the wave plate.

The liquid crystal grating module 23 shown in FIG. 17 may include M liquid crystal gratings 230. In the same liquid crystal grating module 23, the second optical rotator 25 may be disposed between any two adjacent liquid crystal gratings 230. The M liquid crystal gratings in the first direction Z may include the $1^{st}$ liquid crystal grating $LCG_1$ to the $M^{th}$ liquid crystal grating $LCG_M$ in sequence, and M may be a positive integer greater than one. The larger the quantity of the liquid crystal gratings 230 in the liquid crystal grating module 23, the larger the range of deflection adjustment for the propagation direction of the light. To take into account both the range of the propagation direction of the light and the size of the holographic display system in the first direction Z, the quantity of the liquid crystal gratings 230 may be less than or equal to six. In one embodiment, M=3. The value of M may be determined according to practical applications, which may not be limited to the manner of M=3 shown in FIG. 17, and M may be any integer greater than one.

When M=3, as shown in FIG. 18 and FIG. 19, in the same liquid crystal grating module 23, in the first direction Z, the three consecutively arranged liquid crystal gratings 230 may include the first liquid crystal grating $LCG_1$, the second liquid crystal grating $LCG_2$, and the third liquid crystal grating $LCG_3$. The first wave plate 251 may serve as the second optical rotator 25 located between the first liquid crystal grating $LCG_1$ and the second liquid crystal grating $LCG_2$. The second wave plate 252 may serve as the second optical rotator 25 located between the second liquid crystal grating $LCG_2$ and the third liquid crystal grating $LCG_3$.

Referring to FIG. 2 and FIGS. 16-19, for any two adjacent liquid crystal grating modules 23, the alignment direction of the $i^{th}$ liquid crystal grating $LCG_i$ in the liquid crystal grating module 23 (as shown in FIG. 18) close to the spatial light modulator 22 may be the same as the alignment direction of the $(M-i+1)^{th}$ liquid crystal grating $LCG_{(M-i+1)}$ in the liquid crystal grating module 23 far away from the spatial light modulator 22 (as shown in FIG. 19), where i may be a positive integer smaller than or equal to M. For any two adjacent liquid crystal grating modules 23, based on the alignment direction correspondence shown in FIG. 18 and FIG. 19, when each liquid crystal grating module 23 is separately provided with a first optical rotator 24, the polarization direction of the light incident on the corresponding liquid crystal grating module 23 may be independently controlled through the first optical rotator 24, to determine whether the propagation direction of the light to be deflected or not to be deflected after passing through the liquid crystal grating module 23. Such control method may be simple.

Each liquid crystal grating module 23 may include M liquid crystal gratings 230, which may facilitate to perform the corresponding setting on the alignment direction of the liquid crystal grating 230 in two adjacent liquid crystal grating modules 23 in the first direction Z, to control the polarization direction of the light incident on the liquid crystal grating module 23 through the first optical rotator 24, thereby controlling whether the liquid crystal grating module 23 deflects the propagation direction of the light.

In one embodiment, the holographic display system may include two liquid crystal grating modules 23, and the liquid crystal grating module 23 may include three liquid crystal gratings 230, to take into account all the size of the holographic display system in the first direction Z, the range of the deflection adjustment of the propagation direction of the light, and the screen refresh rate of the liquid crystal grating module 23.

Referring to FIG. 2 and FIG. 18, the holographic display system may include two adjacent liquid crystal grating modules 23. In the first direction Z, the alignment directions of the three liquid crystal gratings 230 in the liquid crystal grating module 23 close to the spatial light modulator 22 may have angles of 0°, 45° and 135° with respect to the second direction in sequence. In the liquid crystal grating module 23, the optical axis of the first wave plate 251 may have an angle of 22.5° with respect to the second direction, and the optical axis of the second wave plate 252 may have an angle of 90° with respect to the second direction.

Referring to FIG. 2 and FIG. 19, the alignment directions of the three liquid crystal gratings 230 in the liquid crystal grating module 23 away from the spatial light modulator 22 may have angles of 135°, 45° and 0° with respect to the second direction in sequence. In the liquid crystal grating module 23, the optical axis of the first wave plate 251 may have an angle of 90° with respect to the second direction, and the optical axis of the second wave plate 252 may have an angle of 22.5° with respect to the second direction. The polarization direction of the light emitted from the spatial light modulator 22 may be the second direction, which may be parallel to the X axis. In view of this, the polarization direction of the light emitted from the liquid crystal grating module 23 shown in FIG. 18 may be perpendicular or parallel to the alignment direction of the first liquid crystal grating 230 in the liquid crystal grating module 23 shown in FIG. 19. The first optical rotator 24 located on the light-incident side of the liquid crystal grating module 23 shown in FIG. 19 may control the liquid crystal grating module 23 to deflect the propagation direction of the light or maintain the propagation direction of the light.

Figure 20:
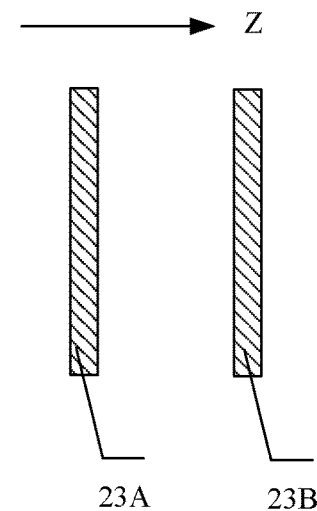
FIG. 20 illustrates a schematic diagram of a layout of a liquid crystal grating module of an exemplary holographic display system consistent with disclosed embodiments of the present disclosure.

FIG. 20 illustrates a schematic diagram of a layout of a liquid crystal grating module of a holographic display system consistent with disclosed embodiments of the present disclosure. Referring to FIG. 2 and FIG. 20, the holographic display system may include at least a first liquid crystal grating module 23A and a second liquid crystal grating module 23B that are adjacently disposed along the first direction Z. The first liquid crystal grating module 23A may be located between the second liquid crystal grating module 23B and the spatial light modulator 22.

Referring to FIGS. 17-20, each of the first liquid crystal grating module 23A and the second liquid crystal grating module 23B may include M liquid crystal gratings 230. In the same liquid crystal grating module 23, the M liquid crystal gratings in the first direction Z may include the $1^{st}$ liquid crystal grating $LCG_1$ to the $M^{th}$ liquid crystal grating $LCG_M$ in sequence, and M may be a positive integer greater than one. The alignment direction of each liquid crystal grating 230 in the first liquid crystal grating module 23A may be shown in FIG. 18, and the alignment direction of each liquid crystal grating 230 in the second liquid crystal grating module 23B may be shown in FIG. 19. The alignment direction of the $i^{th}$ liquid crystal grating $LCG_i$ in the first liquid crystal grating module 23A may be the same as the alignment direction of the $(M-i+1)^{th}$ liquid crystal grating $LCG_{(M-i+1)}$ in the second liquid crystal grating module 23B, and i may be a positive integer less than or equal to M. In view of this, in the first liquid crystal grating module 23A and the second liquid crystal grating module 23B that are adjacently arranged in the first direction Z, the polarization direction of the light emitted from the first liquid crystal grating module 23A may be parallel to or perpendicular to the alignment direction of the first liquid crystal grating $LCG_1$ in the second liquid crystal grating module 23B, which may facilitate the first optical rotator 24 to control the operating mode. Therefore, at least one liquid crystal grating module 23 may deflect the propagation direction of the light, and at least one liquid crystal grating module 23 may not deflect the propagation direction of the light.

When the holographic display system includes two liquid crystal grating modules 23, the liquid crystal gratings 230 and the second optical rotators 25 in the two liquid crystal grating modules 23 may adopt the methods shown in FIG. 18 and FIG. 19, respectively. The principle of adjusting light in two adjacent frames of monochrome sub-images of the holographic display system may be shown in FIG. 21 and FIG. 22.

Figure 21:
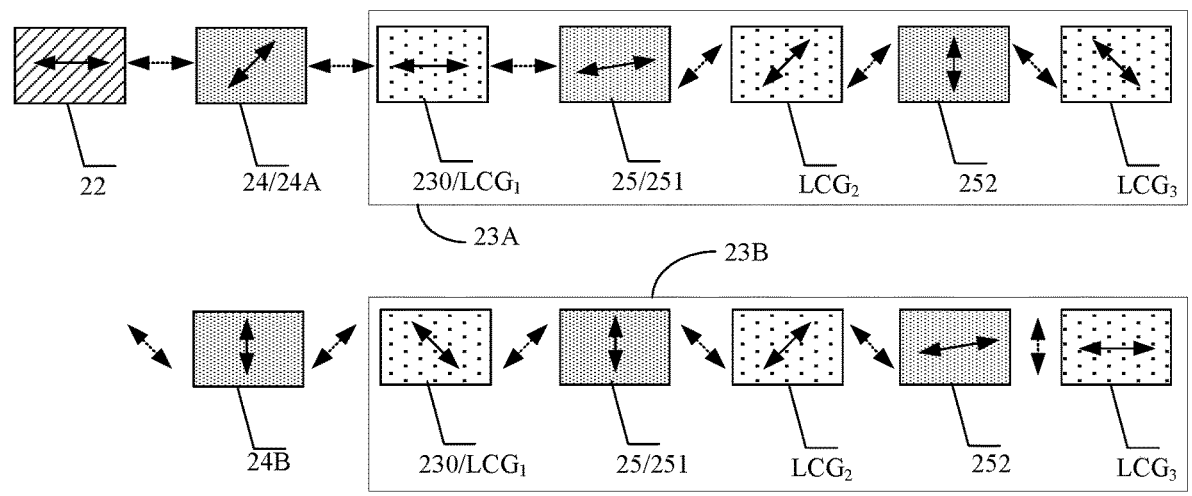
FIGS. 21-22 illustrate principle schematic diagrams of adjusting light in two adjacent frames of monochrome sub-images of an exemplary holographic display system consistent with disclosed embodiments of the present disclosure.
Figure 22:
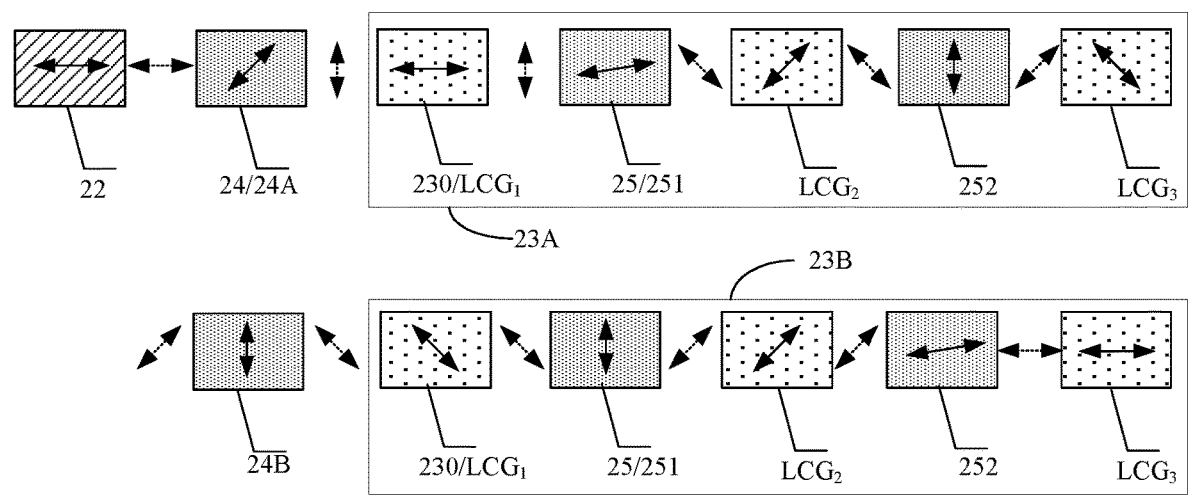

FIGS. 21-22 illustrate principle schematic diagrams of adjusting light in two adjacent frames of monochrome sub-images of a holographic display system consistent with disclosed embodiments of the present disclosure. Referring to FIG. 21 and FIG. 22, for the two adjacent frames of monochrome sub-images, FIG. 21 may be configured to illustrate the principle of adjusting light in the previous frame of the monochrome sub-image, and FIG. 22 may be configured to illustrate the principle of adjusting light in the next frame of the monochrome sub-image.

In one embodiment, the dotted bidirectional arrow may represent the polarization direction of the light, and the solid bidirectional arrow in the spatial light modulator 22 may represent the polarization direction of the light. For illustrative purposes, the first optical rotator 24 may include a single liquid crystal optical rotator 240 as an example, and the solid bidirectional arrow in the first optical rotator 24 may represent the alignment direction of the liquid crystal rotator 240.

In addition, in one embodiment, the first optical rotator 24 in the first operating mode may be defined as in the OFF state, and may not change the polarization direction of the light. The first optical rotator 24 in the second operating mode may be defined as in the ON state, and may change the polarization direction of the light, such that the light having the polarization direction being rotated by 90° may emit out. When the polarization direction of the light is sequentially parallel to each liquid crystal grating 230 in the corresponding liquid crystal grating module 23, after passing through the liquid crystal grating 230, the propagation direction of the light may be deflected. When the polarization direction of the light is sequentially perpendicular to each liquid crystal grating 230 in the corresponding liquid crystal grating module 23, after passing through the liquid crystal grating 230, the propagation direction of the light may remain unchanged, and the propagation direction of the light may not be deflected.

Referring to FIG. 21, the first optical rotator 24A on the light-incident side of the first liquid crystal grating module 23A may be turned off, may not change the polarization direction of the light, such that the light may be incident on the first liquid crystal grating module 23A while maintaining the polarization direction of the light emitted from the spatial light modulator 22. In the first liquid crystal grating module 23A, the polarization direction of the light may be sequentially parallel to each incident liquid crystal grating 230, and after passing through the first liquid crystal grating module 23A, the propagation direction of the light may be deflected. The first optical rotator 24B on the light-incident side of the second liquid crystal grating module 23B may be turned on, and the light may be incident on the second liquid crystal grating module 23B after rotating the polarization direction of the light emitted from the first liquid crystal grating module 23A by 90°. In the second liquid crystal grating module 23B, the polarization direction of the light may be sequentially perpendicular to each incident liquid crystal grating 230, after passing through the second liquid crystal grating module 23B, the propagation direction of the light may remain unchanged, and the propagation direction of the light may not be deflected.

Referring to FIG. 22, the first optical rotator 24A on the light-incident side of the first liquid crystal grating module 23A may be turned on, and after rotating the polarization direction of the light by 90°, the light may be incident on the first liquid crystal grating module 23A. In the first liquid crystal grating module 23A, the polarization direction of the light may be sequentially perpendicular to each incident liquid crystal grating 230, and after passing through the first liquid crystal grating module 23A, the propagation direction of the light may remain unchanged, and the propagation direction of the light may not be deflected. The first optical rotator 24B on the light-incident side of the second liquid crystal grating module 23B may be turned on, and after rotating the polarization direction of the light emitted from the first liquid crystal grating module 23A by 90°, the light may be incident on the second liquid crystal grating module 23B. In the second liquid crystal grating module 23B, the polarization direction of the light may be sequentially parallel to each incident liquid crystal grating 230, and after passing through the second liquid crystal grating module 23B, the propagation direction of the light may be deflected.

In the manners shown in FIG. 21 and FIG. 22, the first liquid crystal grating module 23A may deflect the propagation direction of the light in each odd-numbered frame of the monochrome image, and may not deflect the propagation direction of the light in each even-numbered frame of the monochrome image. The second liquid crystal grating module 23B may not deflect the propagation direction of the light in each odd-numbered frame of the monochrome image, and may deflect the propagation direction of the light in each even-numbered frame of the monochrome image. The first optical rotator 24A may be in the OFF state in each odd-numbered frame of the monochrome image, and may be in the ON state in each even-numbered frame of the monochrome image. The first optical rotator 24B may be in the ON state in both the odd-numbered frame of monochrome image and the even-numbered frame of the monochrome image.

Figure 23:
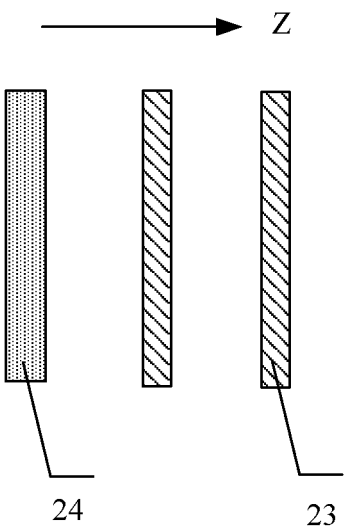
FIG. 23 illustrates a schematic diagram of another layout of a first optical rotator and a liquid crystal grating module of an exemplary holographic display system consistent with disclosed embodiments of the present disclosure.

FIG. 23 illustrates a schematic diagram of another layout of a first optical rotator and a liquid crystal grating module of a holographic display system consistent with disclosed embodiments of the present disclosure. Referring to FIG. 2, FIG. 17 and FIG. 23, the holographic display system may include one first optical rotator 24, and the first optical rotator 24 may be disposed on the light-incident side of the liquid crystal grating module 23 adjacent to the spatial light modulator 22. In view of this, based on the matching setting of the alignment direction of the liquid crystal grating 230 in each liquid crystal grating module 23 and the direction of the optical axis of the second optical rotator 25, within a preset duration, at least one liquid crystal grating module may change the propagation direction of the incident light, and at least one liquid crystal grating module may not change the propagation direction of the incident light through the first optical rotator 24. The quantity of the first optical rotators 24 may be the least, which may reduce the size of the holographic display system in the first direction Z.

When the holographic display system includes one first optical rotator 24, as mentioned above, the liquid crystal grating module 23 may be provided with M liquid crystal gratings 230, and the M liquid crystal gratings 230 may include the first liquid crystal grating $LCG_1$ to the $M^{th}$ liquid crystal grating $LCG_M$ in the first direction Z, where M may be a positive integer greater than one. In view of this, the alignment direction of each liquid crystal grating in two adjacent liquid crystal grating modules 23 may be shown in FIG. 24.

Figure 24:
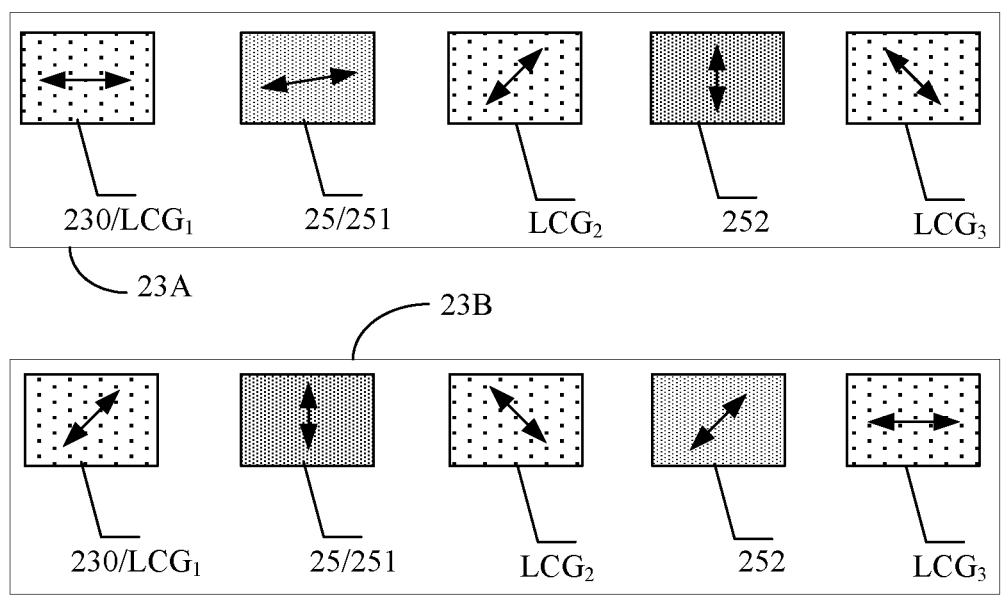
FIG. 24 illustrates a top view of two adjacent liquid crystal grating modules where each liquid crystal grating has an alignment direction facing towards a first direction.

FIG. 24 illustrates a top view of two adjacent liquid crystal grating modules where each liquid crystal grating has an alignment direction facing towards the first direction, and the top view plane may be parallel to the XY plane.

Referring to FIG. 2 and FIG. 24, for any two adjacent liquid crystal grating modules 23, in the first direction Z, the alignment direction of the $i^{th}$ liquid crystal grating $LCG_i$ in a liquid crystal grating module 23 (the first liquid crystal grating module 23A) close to the spatial light modulator 22 and the alignment direction of the $(M-i+1)^{th}$ liquid crystal grating $LCG_{(M-i+1)}$ in a liquid crystal grating module 23 (the second liquid crystal grating module 23B) far away from the spatial light modulator 22 may be centrally symmetric. The alignment direction of the $M^{th}$ liquid crystal grating $LCG_M$ in the liquid crystal grating module 23 close to the spatial light modulator 22 may be perpendicular to the alignment direction of the first liquid crystal grating $LCG_1$ in the liquid crystal grating module 23 far away from the spatial light modulator 22, where i may be a positive integer less than or equal to M.

In the first direction Z, the alignment direction of the $i^{th}$ liquid crystal grating $LCG_i$ in the first liquid crystal grating module 23A and the alignment direction of the $(M-i+1)^{th}$ liquid crystal grating $LCG_{(M-i+1)}$ in the second liquid crystal grating module 23B may be centrally symmetric. In view of this, if the top views of all the liquid crystal gratings 230 on the XY plane are arranged sequentially along a straight line in a plane based on the arrangement order in the first direction Z, the alignment direction of the $i^{th}$ liquid crystal grating $LCG_i$ in the first liquid crystal grating module 23A and the alignment direction of the $(M-i+1)^{th}$ liquid crystal grating $LCG_{(M-i+1)}$ in the second liquid crystal grating module 23B may be symmetric with respect to an axis perpendicular to the straight line.

In the manner shown in FIG. 24, whether each liquid crystal grating module 23 deflects the propagation direction of the incident light may be controlled through one first optical rotator 24. Compared with the method of separately disposing a first optical rotator 24 for each liquid crystal grating module 23, the size of the holographic display system in the first direction Z may be reduced.

Referring to FIG. 2 and FIG. 24, when the holographic display system includes one first optical rotator 24, the holographic display system may include two liquid crystal grating modules 23, and the liquid crystal grating module 23 may include three liquid crystal gratings. In the first direction Z, the alignment directions of the three liquid crystal gratings 230 in the liquid crystal grating module 23 (the first liquid crystal grating module 23A) close to the spatial light modulator 22 may have angles of 0°, 45° and 135° with respect to the second direction in sequence. In the first direction Z, the alignment directions of the three liquid crystal gratings 230 in the liquid crystal grating module 23 (the second liquid crystal grating module 23B) far away from the spatial light modulator 22 may have angles of 45°, 135° and 0° with respect to the second direction in sequence. The polarization direction of the light emitted from the spatial light modulator 22 may be the second direction.

As shown in FIG. 24, in the first liquid crystal grating module 23A, the optical axis of the first wave plate 251 may have an angle of 22.5° with respect to the second direction, and the optical axis of the second wave plate 252 may have an angle of 90° with respect to the second direction. In the second liquid crystal grating module 23B, the optical axis of the first wave plate 251 may have an angle of 90° with respect to the second direction, and the optical axis of the second wave plate 252 may have an angle of 45° with respect to the second direction.

The alignment direction of each liquid crystal grating 230 in two adjacent liquid crystal grating modules 23 and the direction of the optical axis of the second optical rotator 25 may be correspondingly set in the manner shown in FIG. 24. The holographic display system may control whether each liquid crystal grating module 23 deflects the propagation direction of the incident light through one first optical rotator 24, such that the size of the holographic display system in the first direction Z may be reduced.

In one embodiment, in the disclosed holographic display system, the second optical rotator 25 may include a half-wave plate. The direction of the optical axis of the half-wave plate may be adapted to the alignment direction of the adjacent liquid crystal grating 230, such that the polarization direction of the light transmitted in the liquid crystal grating module 230 may be parallel to the alignment direction of each liquid crystal grating 230 or perpendicular to the alignment direction of each liquid crystal grating 230.

In the first direction Z, for two adjacent liquid crystal grating modules 23, the alignment direction of the last liquid crystal grating 230 in the liquid crystal grating module 23 close to the spatial light modulator 22 may be perpendicular to or parallel to the alignment direction of the first liquid crystal grating 230 in the liquid crystal grating module 23 far away from the spatial light modulator 22. Within a preset duration, at least one liquid crystal grating module 23 may change the propagation direction of the incident light, and at least one liquid crystal grating module 23 may not change the propagation direction of the incident light through the first optical rotator 24.

In the manner shown in FIG. 24, the alignment direction of the third liquid crystal grating $LCG_3$ in the first liquid crystal grating module 23A may be perpendicular to the alignment direction of the first liquid crystal grating $LCG_1$ in the second liquid crystal grating module 23B. Based on the method shown in FIG. 24, the principle of adjusting light in two adjacent frames of monochrome sub-images of the holographic display system may be shown in FIG. 25 and FIG. 26.

Figure 25:
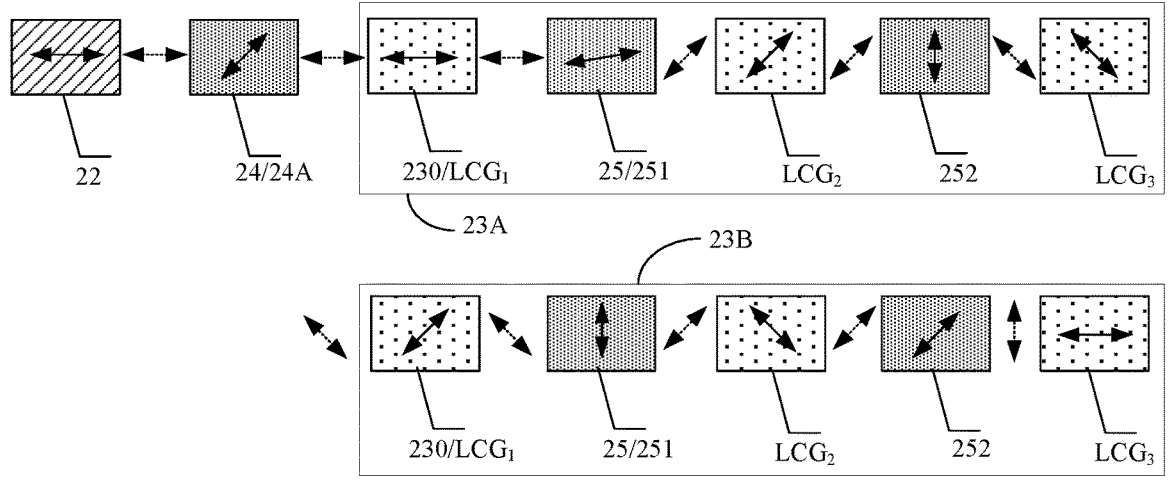
FIGS. 25-26 illustrate principle schematic diagrams of adjusting light in two adjacent frames of monochrome sub-images of another exemplary holographic display system consistent with disclosed embodiments of the present disclosure.
Figure 26:
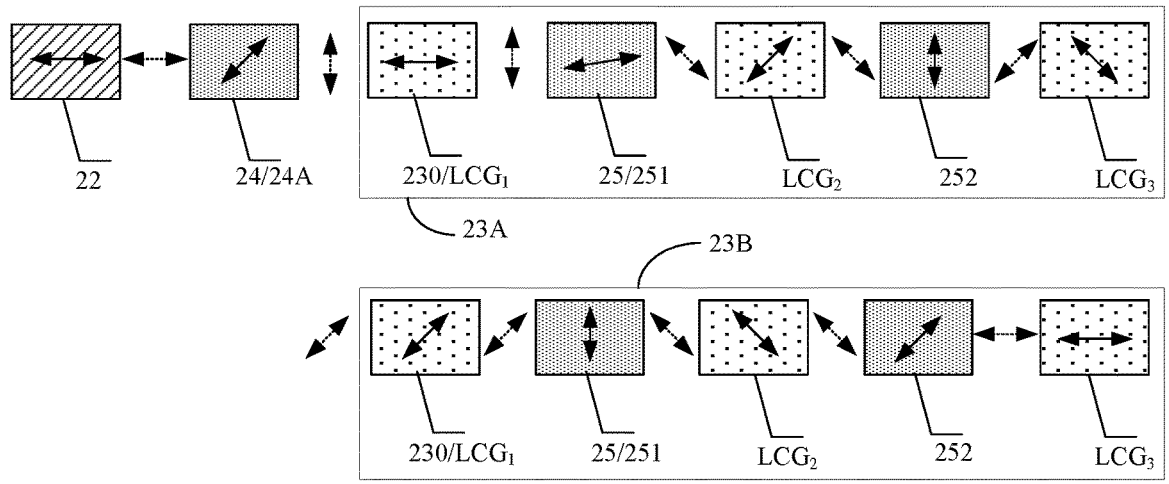

FIGS. 25-26 illustrate principle schematic diagrams of adjusting light in two adjacent frames of monochrome sub-images of a holographic display system consistent with disclosed embodiments of the present disclosure. For the two adjacent frames of monochrome sub-images, FIG. 25 may be configured to illustrate the principle of adjusting light in the previous frame of the monochrome sub-image, and FIG. 26 may be configured to illustrate the principle of adjusting light in the next frame of the monochrome sub-image.

Referring to FIG. 25 and FIG. 26, it can be seen that the method shown in FIG. 24 may also make the first liquid crystal grating module 23A and the second liquid crystal grating module 23B alternately deflect the propagation direction of the light, thereby reducing the screen refresh rate of the liquid crystal grating module 23.

In one embodiment, at a same moment, one liquid crystal grating 230 may change the propagation direction of the incident light, and the other liquid crystal gratings may maintain the propagation direction of the incident light. Within the preset duration, the backlight module 21 may refresh the backlight beam at a first frequency, and the liquid crystal grating module 23 may change the propagation direction of the incident light at a second frequency, where the first frequency may be N times the second frequency, and N may be the quantity of the liquid crystal grating modules 23 in the holographic display system.

For the holographic display system with single liquid crystal grating module 13 shown in FIG. 1, if the first frequency is 360 Hz, the liquid crystal grating module 13 may be required to refresh the monochrome sub-image 360 times within one second, in other words, the second frequency may be 360 Hz. In view of this, the first frequency may be equal to the second frequency.

However, for the disclosed holographic display system with N liquid crystal grating modules 23, if the first frequency is 360 Hz, the N liquid crystal grating modules 23 may jointly refresh the monochrome sub-image 360 times, and then each of the N liquid crystal grating modules 23 may need to refresh the monochrome sub-image 360/N times on average. In view of this, the second frequency may be 360/N Hz, and the first frequency may be equal to N times the second frequency, in other words, the second frequency may be merely 1/N of the first frequency.

The effect of reducing the screen refresh rate of the liquid crystal grating module 23 in the present disclosure compared with the case associated with FIG. 1 may be described below in combination with timing diagrams.

Figure 27:
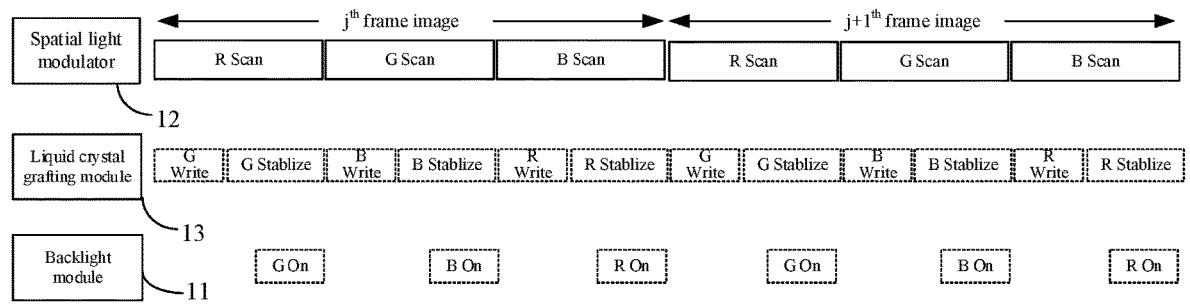
FIG. 27 illustrates a timing diagram of the holographic display system shown in FIG. 1.

FIG. 27 illustrates a timing diagram of the holographic display system shown in FIG. 1. Referring to FIG. 1 and FIG. 27, for the $j^{th}$ frame image and the $(j+1)^{th}$ frame image that are adjacent in timing, both the $j^{th}$ frame image and the $(j+1)^{th}$ frame image may include a red sub-image, a green sub-image, and a blue sub-image, where j may be a positive integer greater than one. In a duration of displaying one frame image, the backlight module 11 may need to turn on the red light (R), green light (G) and blue light (B) in a time-sharing manner. For each color backlight, the spatial light modulator 12 may require ⅓ duration of displaying one frame image to complete the adjustment of the scanning of the corresponding color backlight. For each color backlight, the liquid crystal grating module 13 may require ⅓ duration of displaying one frame image to complete the adjustment of the data writing of the corresponding color backlight and post-deflection stabilization of the liquid crystal molecules.

Based on FIG. 27, if the backlight module 11 has 360 backlight turn-on periods in one second, the corresponding backlight operating frequency may be 360 Hz, and then the liquid crystal grating module 13 may correspond to 360 times of data writing of the backlight and post-deflection stabilization of liquid crystal molecules. In other words, the screen refresh rate of the liquid crystal grating module 13 may be 360 Hz. The screen refresh rate of the liquid crystal grating module 13 may be the same as the operating frequency of the backlight. The liquid crystal grating module 13 may operate at 360 Hz, and the time period for charging the liquid crystal grating and flipping the liquid crystal molecules in the liquid crystal grating module 13 may be substantially small.

Figure 28:
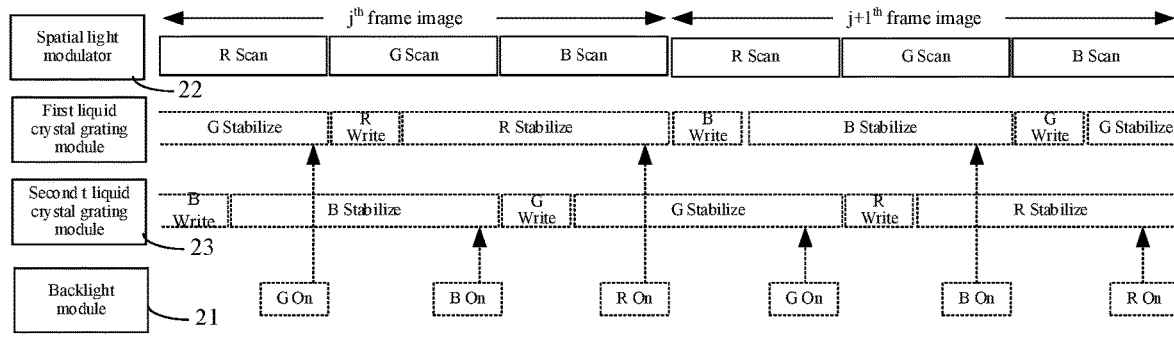
FIG. 28 illustrates a timing diagram of an exemplary holographic display system consistent with disclosed embodiments of the present disclosure.

FIG. 28 illustrates a timing diagram of a holographic display system consistent with disclosed embodiments of the present disclosure. Referring to FIG. 2, FIG. 23 and FIG. 28, the holographic display system may include one first optical rotator 24 and two liquid crystal grating modules 23. For the $j^{th}$ frame image and the $(j+1)^{th}$ frame image that are adjacent in timing, both the $j^{th}$ frame image and the $(j+1)^{th}$ frame image may include a red sub-image, a green sub-image, and a blue sub-image, where j may be a positive integer greater than one. Similarly, in a duration of displaying one frame image, the backlight module 21 may need to turn on the red light (R), green light (G) and blue light (B) in a time-sharing manner. For each color backlight, the spatial light modulator 22 may require ⅓ duration of displaying one frame image to complete the adjustment of the scanning of the corresponding color backlight. The difference between the case associated with FIG. 28 and the case associated with FIG. 27 may include that in a duration of displaying two frame images, the RGB three color backlights may need to perform the data writing process and post-deflection stabilization of liquid crystal molecules once, respectively. If the backlight module 21 operates at 360 Hz, each liquid crystal grating module 23 may merely need to operate at 180 Hz, which may greatly reduce the difficulty of designing and driving the device.

Based on FIG. 28, the operating frequency of the first optical rotator 24 may be twice the screen refresh rate of the liquid crystal grating module 23.

Moreover, the method shown in FIG. 28 may greatly increase the duration of the post-deflection stabilization of liquid crystal molecules, and may make the liquid crystal molecules control the light deflection after being fully stabilized, thereby improving the accuracy of the light deflection control.

Based on the above description, the disposure of N liquid crystal grating modules 23 may reduce the screen refresh rate of the liquid crystal grating module 23 to 1/N of that shown in FIG. 1. Taking the backlight module 21 operating at 360 Hz as an example, if N=2, the screen refresh rate of the liquid crystal grating module 23 may be reduced to 180 Hz; and if N=3, the screen refresh rate of the liquid crystal grating module 23 may be reduced to 120 Hz.

Figure 29:
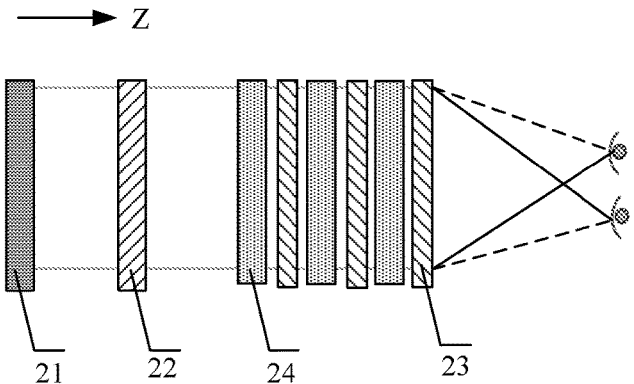
FIG. 29 illustrates a schematic diagram of another exemplary holographic display system consistent with disclosed embodiments of the present disclosure.

FIG. 29 illustrates a schematic diagram of a holographic display system consistent with disclosed embodiments of the present disclosure. Referring to FIG. 29, the holographic display system may include three liquid crystal grating modules 23, and one first optical rotator 24 may be correspondingly disposed on the light-incident side of each liquid crystal grating module 23. As mentioned above, taking into account both the size of the holographic display system in the first direction Z and the frequency reduction requirements of the liquid crystal grating module 23, the quantity of the liquid crystal grating modules 23 in the holographic display system may be two or three, which may not be limited by the present disclosure.

In one embodiment, a field lens may be disposed between the spatial light modulator 22 and the adjacent liquid crystal grating module 23, and both the first optical rotator 24 and the liquid crystal grating module 23 may be located on the side of the field lens away from the spatial light modulator 22. The field lens may be configured to improve the ability of the marginal light emitted from the spatial light modulator 22 to enter the liquid crystal grating module 23.

In the above disclosed holographic display system, at least one first optical rotator 24 may be provided to switch the polarization direction of light in two orthogonal directions during the display process. Therefore, within the preset duration, at least one liquid crystal grating module 23 may change the propagation direction of the incident light, and at least one liquid crystal grating module 23 may not change the propagation direction of the incident light, thereby reducing the screen refresh rate of the liquid crystal grating module 23. The holographic display system may include at least two liquid crystal grating modules 23, which may control the deflection of the propagation direction of the light in a time-sharing manner. Whether the liquid crystal grating module 23 deflects the propagation direction of the light may be controlled by the control of the polarization direction of the light by the first optical rotator 24.

Figure 30:
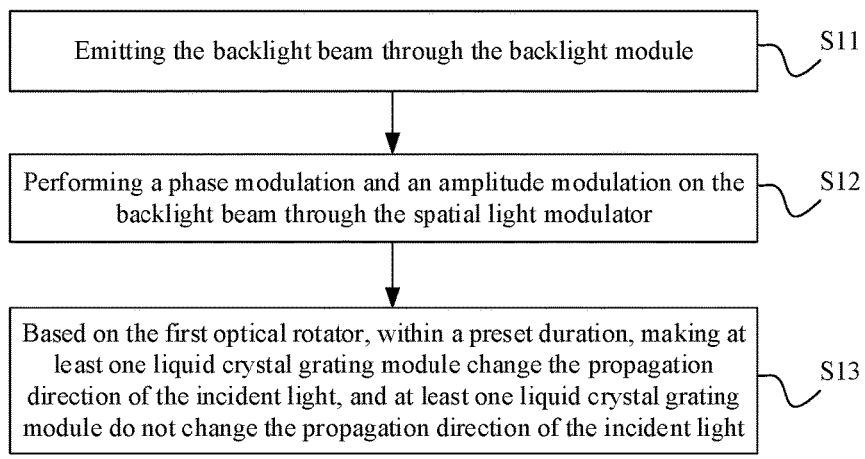
FIG. 30 illustrates a schematic flowchart of an exemplary holographic display method consistent with disclosed embodiments of the present disclosure.

Based on the above embodiments, the present disclosure also provides a holographic display method of a holographic display system. The holographic display system may include any one of the disclosed holographic display system. FIG. 30 illustrates a schematic flowchart of a holographic display method consistent with disclosed embodiments of the present disclosure. Referring to FIG. 30, the holographic display method may include following.

S11: emitting the backlight beam through the backlight module.

S12: performing a phase modulation and an amplitude modulation on the backlight beam through the spatial light modulator.

S13: based on the first optical rotator, within a preset duration, making at least one liquid crystal grating module change the propagation direction of the incident light, and at least one liquid crystal grating module do not change the propagation direction of the incident light.

In the holographic display method, the implementation principle of whether the liquid crystal grating module changes the propagation direction of the incident light may refer to the description in the above embodiments, which may not be repeated herein.

Based on the above-disclosed holographic display system, the holographic display method may be realized, which may greatly reduce the screen refresh rate of the liquid crystal grating module.

Figure 31:
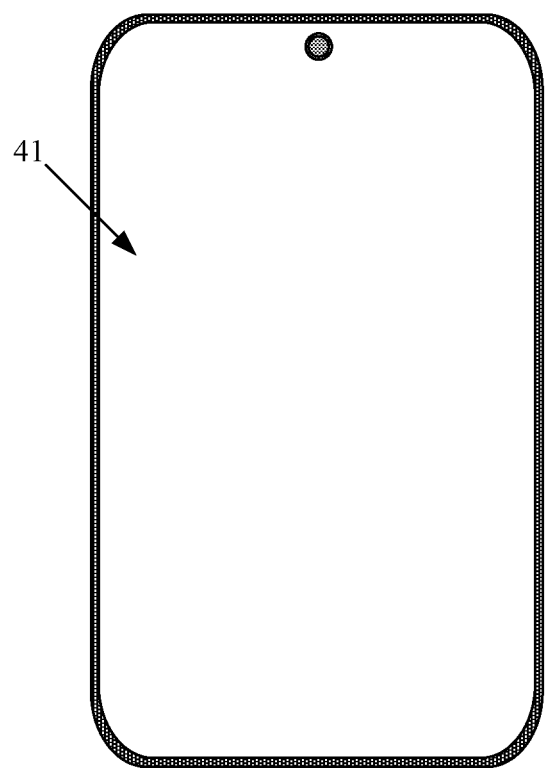
FIG. 31 illustrates a schematic diagram of an exemplary electronic device consistent with disclosed embodiments of the present disclosure.

Based on the foregoing embodiments, the present disclosure also provides an electronic device. FIG. 31 illustrates a schematic diagram of an electronic device consistent with disclosed embodiments of the present disclosure. Referring to FIG. 31, the electronic device 41 may include a holographic display system, and the holographic display system may adopt any one of the above-disclosed holographic display systems.

The electronic device may include an electronic product with a display function, such as a mobile phone, a computer, a wearable device, a television, and a vehicle display device. The electronic device may adopt any one of the above-disclosed holographic display system, which may greatly reduce the screen refresh rate of the liquid crystal grating module.

The disclosed holographic display system, holographic display method and the electronic device may have following beneficial effects. The disclosed holographic display system may include the plurality of liquid crystal grating modules, and within the preset duration, at least one liquid crystal grating module may change the propagation direction of the incident light, and at least one liquid crystal grating module may not change the propagation direction of the incident light through the first optical rotator. In view of this, at a same moment, at least one liquid crystal grating module may deflect the propagation direction of the incident light, and at least one of the liquid crystal grating module may not need to deflect the propagation direction of the incident light, thereby reducing the screen refresh rate of the liquid crystal grating module.

The disclosed holographic display method may adopt the above-disclosed holographic display system. When performing the holographic display, at a same moment, at least one liquid crystal grating module may deflect the propagation direction of the incident light, and at least one of the liquid crystal grating module may not need to deflect the propagation direction of the incident light, thereby reducing the screen refresh rate of the liquid crystal grating module.

The disclosed electronic device may adopt the above-disclosed holographic display system. When performing the holographic display, at a same moment, at least one liquid crystal grating module may deflect the propagation direction of the incident light, and at least one of the liquid crystal grating module may not need to deflect the propagation direction of the incident light, thereby reducing the screen refresh rate of the liquid crystal grating module.

The various embodiments in the present specification are described in a progressive, parallel, or progressive and parallel manner. Each embodiment mainly describes in terms of differences from other embodiments, and the same or similar parts between the various embodiments may be referred to each other. Because the disclosed electronic device and holographic display method correspond to the holographic display method disclosed in the embodiments, the description thereof may be substantially simple, and the related information may refer to the description of the corresponding part of the holographic display system.

It should be noted that in the description of the present disclosure, the descriptions of the Figures and embodiments are illustrative rather than restrictive. In addition, for the sake of understanding and ease of description, the drawings may exaggerate the thickness of certain layers, films, panels, and regions, etc.

It should be understood that when describing the structure of a component, when a layer or a region is referred to as being "on" or "above" another layer or another region, the layer or the region may be directly on the other layer or the other region, or other layers or regions may be contained between the layer or the region and the another layer or the another region. Further, when a component is turned over, the layer or the region may be "under" or "below" the another layer or the another region.

It should be noted that the orientation or positional relationship indicated by the terms "upper", "lower", "top", "bottom", "inner" and "outer" are based on the orientation or positional relationship shown in the drawings, which is only for the convenience of describing the present disclosure and simplifying the description, and does not indicate or imply that the referred device or component must have a specific orientation, be constructed and operated in a specific orientation, and therefore cannot be understood as limitations on the present disclosure. When a component is considered to be "connected" to another component, the component may be directly connected to the another component, or there may be a component disposed therebetween.

It should be noted that the relational terms such as "first" and "second" are merely used to distinguish one entity or operation from another entity or operation, and do not necessarily require or imply any such actual relationship or sequence between these entities or operations.

Moreover, the terms "include", "contain" or any variant may be intended to cover non-exclusive inclusion, such that a process, a method, an article, or a device that includes a series of elements may not only include such elements, but also include any other element that is not clearly listed, or may include elements inherent to such process, method, article or device. In a case without more restrictions, the element defined by the sentence "including . . . " may not exclude the existence of any other same element in the process, method, article, or device that includes the element.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A holographic display system, comprising:
a backlight module, a spatial light modulator, and a plurality of liquid crystal grating modules that are sequentially arranged in a first direction, wherein:
  the backlight module is configured to emit a backlight beam,
  the spatial light modulator is configured to perform a phase modulation and an amplitude modulation on the backlight beam,
  the plurality of liquid crystal grating modules are sequentially disposed in the first direction, and based on a polarization direction of incident light, a liquid crystal grating module of the plurality of liquid crystal grating modules is capable of changing a propagation direction of the incident light or maintaining the propagation direction of the incident light, and
  a first optical rotator is disposed on a light-incident side of at least one liquid crystal grating module of the plurality of liquid crystal grating modules, and the first optical rotator is capable of rotating the polarization direction of the incident light, to make at least one liquid crystal grating module change the propagation direction of the incident light, and at least one liquid crystal grating module do not change the propagation direction of the incident light within a preset duration.

2. The holographic display system according to claim 1, wherein:
the first optical rotator includes a first operating mode and a second operating mode, wherein:
  in the first operating mode, the first optical rotator is capable of making the incident light maintain the polarization direction and then pass through the first optical rotator, and
  in the second operating mode, the first optical rotator is capable of making the incident light have the polarization direction rotated by (n−1)*180°+90° and then pass through the first optical rotator, wherein n is a positive integer, and a rotation axis has a direction perpendicular to a plane where the first optical rotator is located.

3. The holographic display system according to claim 2, wherein:
the first optical rotator includes at least one liquid crystal optical rotator, wherein:
  the liquid crystal optical rotator includes a first electrode layer and a second electrode layer that are oppositely arranged, and a first liquid crystal layer disposed between the first electrode layer and the second electrode layer, and
  the holographic display system includes a controller, and the controller is connected to the first and second electrode layers of the liquid crystal optical rotator, wherein:
    in the first operating mode, the controller is configured to provide a first control voltage for the first electrode layer and the second electrode layer, to make a long axis of a liquid crystal molecule be perpendicular to the plane where the first optical rotator is located, and
    in the second operating mode, the controller is configured to provide a second control voltage for the first electrode layer and the second electrode layer, to make the long axis of the liquid crystal molecule have an angle of greater than or equal to 0° and less than 90° with the plane where the first optical rotator is located, wherein the first control voltage is different from the second control voltage.

4. The holographic display system according to claim 3, wherein:
the first optical rotator includes a plurality of liquid crystal optical rotators, and every liquid crystal optical rotator makes the polarization direction of the incident light be rotated by a preset angle based on a same rotation direction, respectively, wherein the preset angle is positively related to a first angle, and the first angle is an angle between an alignment direction of the first liquid crystal layer and the polarization direction of the light incident on the liquid crystal optical rotator of the plurality of liquid crystal optical rotators.

5. The holographic display system according to claim 3, wherein:
the first optical rotator includes two liquid crystal optical rotators, and the two liquid crystal optical rotators include a first liquid crystal optical rotator and a second liquid crystal optical rotator that are sequentially disposed along the first direction, wherein:
  in a preset XY coordinate system, a XY plane is parallel to the plane where the first optical rotator is located, and the polarization direction of the light incident on the first optical rotator is parallel to an X axis,
  an angle between an alignment direction of the first liquid crystal layer in the first liquid crystal optical rotator and a positive direction of the X axis is 22.5°, and an angle between an alignment direction of the first liquid crystal layer in the second liquid crystal optical rotator and the positive direction of the X axis is 67.5°.

6. The holographic display system according to claim 3, wherein:
the first optical rotator includes one liquid crystal optical rotator, and an angle between an alignment direction of the first liquid crystal layer and the polarization direction of the incident light is 45°.

7. The holographic display system according to claim 3, wherein:
the backlight module is capable of emitting multiple backlight sub-beams with different colors in a time-sharing mode, wherein:
in the first operating mode, the controller is configured to provide a same first control voltage for the at least one liquid crystal optical rotator during turn-on periods of the backlight sub-beams with different colors, and
in the second operating mode, the controller is configured to provide a same second control voltage for the at least one liquid crystal optical rotator during the turn-on periods of the backlight sub-beams with different colors.

8. The holographic display system according to claim 6, wherein:
the backlight module is capable of emitting multiple backlight sub-beams with different colors in a time-sharing mode, wherein:
in the first operating mode, the controller is configured to provide a same first control voltage for the liquid crystal optical rotator during turn-on periods of the backlight sub-beams with different colors, and
in the second operating mode, the controller is configured to provide different second control voltages for the liquid crystal optical rotator during the turn-on periods of the backlight sub-beams with different colors.

9. The holographic display system according to claim 8, wherein:
the backlight module emits at least a red backlight sub-beam, a green backlight sub-beam, and a blue backlight sub-beam in a time-sharing mode, and
in the second operating mode, the second control voltages of the liquid crystal optical rotator corresponding to a turn-on period of the blue backlight sub-beam, a turn-on period of the green backlight sub-beam and a turn-on period of the red backlight sub-beam decrease successively.

10. The holographic display system according to claim 1, wherein:
the liquid crystal grating module includes a plurality of liquid crystal gratings that are sequentially arranged in the first direction, and alignment directions of the liquid crystal gratings are different from each other,
in a same liquid crystal grating module, a second optical rotator is disposed between two adjacent liquid crystal gratings of the plurality of liquid crystal gratings, and
in the same liquid crystal grating module, for any two adjacent liquid crystal gratings in the first direction, the second optical rotator is configured to rotate the polarization direction of light exiting from a previous liquid crystal grating, to make a polarization direction of the light be parallel to an alignment direction of a next liquid crystal grating, or to make the polarization direction of the light be perpendicular to the alignment direction of the next liquid crystal grating.

11. The holographic display system according to claim 10, wherein:
the first optical rotator is disposed on the light-incident side of every liquid crystal grating module of the plurality of liquid crystal grating modules.

12. The holographic display system according to claim 11, wherein:
the liquid crystal grating module includes M liquid crystal gratings, and the M liquid crystal gratings include a $1^{st}$ liquid crystal grating to a $M^{th}$ liquid crystal grating in sequence in the first direction, wherein M is a positive integer greater than one, and
for any two adjacent liquid crystal grating modules of the plurality of liquid crystal grating modules, an alignment direction of an $i^{th}$ liquid crystal grating in a liquid crystal grating module close to the spatial light modulator is the same as an alignment direction of a $(M-i+1)^{th}$ liquid crystal grating in another liquid crystal grating module far away from the spatial light modulator, wherein i is a positive integer smaller than or equal to M.

13. The holographic display system according to claim 12, wherein:
the holographic display system includes two liquid crystal grating modules, and each liquid crystal grating module includes three liquid crystal gratings, and
in the first direction, alignment directions of the three liquid crystal gratings in the liquid crystal grating module close to the spatial light modulator have angles of 0°, 45° and 135° in sequence with respect to a second direction, and alignment directions of the three liquid crystal gratings in the liquid crystal grating module far away from the spatial light modulator have angles of 135°, 45° and 0° in sequence with respect to the second direction, wherein the polarization direction of the light emitted from the spatial light modulator is the second direction.

14. The holographic display system according to claim 1, wherein:
the holographic display system includes at least a first liquid crystal grating module and a second liquid crystal grating module that are adjacently disposed along the first direction, and the first liquid crystal grating module is located between the second liquid crystal grating module and the spatial light modulator,
each of the first liquid crystal grating module and the second liquid crystal grating module includes M liquid crystal gratings, and in a same liquid crystal grating module, the M liquid crystal gratings include a $1^{st}$ liquid crystal grating to a $M^{th}$ liquid crystal grating in sequence in the first direction, wherein M is a positive integer greater than one, and
an alignment direction of an $i^{th}$ liquid crystal grating in the first liquid crystal grating module is the same as an alignment direction of a $(M-i+1)^{th}$ liquid crystal grating in the second liquid crystal grating module, wherein i is a positive integer less than or equal to M.

15. The holographic display system according to claim 10, wherein:
the holographic display system includes one first optical rotator, and the first optical rotator is disposed on the light-incident side of the liquid crystal grating module adjacent to the spatial light modulator.

16. The holographic display system according to claim 15, wherein:

the liquid crystal grating module includes M liquid crystal gratings, and the M liquid crystal gratings include a $1^{st}$ liquid crystal grating to a $M^{th}$ liquid crystal grating in sequence in the first direction, wherein M is a positive integer greater than one, and for any two adjacent liquid crystal grating modules, in the first direction, an alignment direction of an $i^{th}$ liquid crystal grating in a liquid crystal grating module close to the spatial light modulator and an alignment direction of a $(M-i+1)^{th}$ liquid crystal grating in a liquid crystal grating module far away from the spatial light modulator are centrally symmetric, and an alignment direction of the $M^{th}$ liquid crystal grating in the liquid crystal grating module close to the spatial light modulator is perpendicular to an alignment direction of the $1^{st}$ liquid crystal grating in the liquid crystal grating module far away from the spatial light modulator, wherein i is a positive integer less than or equal to M.

17. The holographic display system according to claim 16, wherein:

the holographic display system includes two liquid crystal grating modules, and each liquid crystal grating module includes three liquid crystal gratings, and in the first direction, alignment directions of the three liquid crystal gratings in the liquid crystal grating module close to the spatial light modulator have angles of 0°, 45° and 135° in sequence with respect to a second direction, and alignment directions of the three liquid crystal gratings in the liquid crystal grating module far away from the spatial light modulator have angles of 45°, 135° and 0° in sequence with respect to the second direction, wherein the polarization direction of the light emitted from the spatial light modulator is the second direction.

18. The holographic display system according to claim 11, wherein:

the second optical rotator includes a half-wave plate.

19. The holographic display system according to claim 1, wherein:

at a same moment, one liquid crystal grating of the plurality of liquid crystal gratings changes the propagation direction of the incident light, and any other liquid crystal grating of the plurality of liquid crystal gratings maintains the propagation direction of the incident light, and within a preset duration, the backlight module refreshes the backlight beam at a first frequency, and the liquid crystal grating module changes the propagation direction of the incident light at a second frequency, wherein the first frequency is N times the second frequency, and N is a quantity of the liquid crystal grating modules in the holographic display system.

20. A holographic display method, comprising:

providing a holographic display system, the holographic display system including:

a backlight module, a spatial light modulator, and a plurality of liquid crystal grating modules that are sequentially arranged in a first direction, wherein:

the backlight module is configured to emit a backlight beam, the spatial light modulator is configured to perform a phase modulation and an amplitude modulation on the backlight beam, the plurality of liquid crystal grating modules are sequentially disposed in the first direction, and based on a polarization direction of incident light, a liquid crystal grating module of the plurality of liquid crystal grating modules is capable of changing a propagation direction of the incident light or maintaining the propagation direction of the incident light, and a first optical rotator is disposed on a light-incident side of at least one liquid crystal grating module of the plurality of liquid crystal grating modules, and the first optical rotator is capable of rotating the polarization direction of the incident light, to make at least one liquid crystal grating module change the propagation direction of the incident light, and at least one liquid crystal grating module do not change the propagation direction of the incident light within a preset duration;

emitting the backlight beam through the backlight module;

performing a phase modulation and an amplitude modulation on the backlight beam through the spatial light modulator; and based on the first optical rotator, within the preset duration, making at least one liquid crystal grating module change the propagation direction of the incident light, and at least one liquid crystal grating module do not change the propagation direction of the incident light.

21. An electronic device, comprising:

a holographic display system, the holographic display system including:

a backlight module, a spatial light modulator, and a plurality of liquid crystal grating modules that are sequentially arranged in a first direction, wherein:

the backlight module is configured to emit a backlight beam, the spatial light modulator is configured to perform a phase modulation and an amplitude modulation on the backlight beam, the plurality of liquid crystal grating modules are sequentially disposed in the first direction, and based on a polarization direction of incident light, a liquid crystal grating module of the plurality of liquid crystal grating modules is capable of changing a propagation direction of the incident light or maintaining the propagation direction of the incident light, and a first optical rotator is disposed on a light-incident side of at least one liquid crystal grating module of the plurality of liquid crystal grating modules, and the first optical rotator is capable of rotating the polarization direction of the incident light, to make at least one liquid crystal grating module change the propagation direction of the incident light, and at least one liquid crystal grating module do not change the propagation direction of the incident light within a preset duration.

* * * * *